(12) United States Patent
Lee et al.

(10) Patent No.: US 12,033,607 B2
(45) Date of Patent: Jul. 9, 2024

(54) ACOUSTIC ARTICLE AND RELATED METHODS

(71) Applicant: 3M INNOVATIVE PROPERTIES COMPANY, St. Paul, MN (US)

(72) Inventors: Seungkyu Lee, Woodbury, MN (US); Megan A. Creighton, Somerville, MA (US); Jonathan H. Alexander, Roseville, MN (US); Michael R. Berrigan, Oakdale, MN (US); Thomas P. Hanschen, Mendota Heights, MN (US)

(73) Assignee: 3M Innovative Properties Company

( * ) Notice: Subject to any disclaimer, the term of this patent is extended or adjusted under 35 U.S.C. 154(b) by 750 days.

(21) Appl. No.: 16/755,787

(22) PCT Filed: Oct. 19, 2018

(86) PCT No.: PCT/US2018/056671
§ 371 (c)(1),
(2) Date: Apr. 13, 2020

(87) PCT Pub. No.: WO2019/079695
PCT Pub. Date: Apr. 25, 2019

(65) Prior Publication Data
US 2021/0375251 A1 Dec. 2, 2021

Related U.S. Application Data

(60) Provisional application No. 62/574,509, filed on Oct. 19, 2017.

(51) Int. Cl.
*G10K 11/168* (2006.01)
*B32B 3/26* (2006.01)
(Continued)

(52) U.S. Cl.
CPC ............ *G10K 11/168* (2013.01); *B32B 3/266* (2013.01); *B32B 5/022* (2013.01); *B32B 27/20* (2013.01);
(Continued)

(58) Field of Classification Search
CPC ....... G10K 11/168; B32B 3/266; B32B 5/022; B32B 27/20; B32B 27/32;
(Continued)

(56) References Cited

U.S. PATENT DOCUMENTS 3,971,373 A 7/1976 Braun
4,118,531 A 10/1978 Hauser
(Continued)

FOREIGN PATENT DOCUMENTS

CN 202492941 10/2012
CN 103696132 4/2014
(Continued)

OTHER PUBLICATIONS

CN 112218697 Jan. 12, 2021.*
(Continued)

*Primary Examiner* — Forrest M Phillips
(74) *Attorney, Agent, or Firm* — Philip P. Soo

(57) ABSTRACT

Provided are acoustic articles having a porous layer (102, 104, 106) placed in contact with a heterogeneous filler comprising porous carbon and having an average surface area of from 0.1 m²/g to 10,000 m²/g. The acoustic articles can have a flow resistance of from 10 MKS Rayls to 5000 MKS Rayls. Optionally, the porous layer includes a non-woven fibrous layer or a perforated film having a plurality of apertures with an average narrowest diameter of from 30 micrometers to 5000 micrometers. The heterogeneous filler
(Continued)

can enhance low frequency performance without significantly compromising high frequency performance, thickness or weight.

16 Claims, 9 Drawing Sheets

(51) Int. Cl.
    *B32B 5/02*     (2006.01)
    *B32B 27/20*    (2006.01)
    *B32B 27/32*    (2006.01)
    *D06M 11/74*    (2006.01)
    *D06M 101/20*   (2006.01)

(52) U.S. Cl.
    CPC .............. *B32B 27/32* (2013.01); *D06M 11/74* (2013.01); *B32B 2262/0253* (2013.01); *B32B 2262/0292* (2013.01); *B32B 2264/108* (2013.01); *B32B 2264/2031* (2020.08); *B32B 2264/307* (2020.08); *B32B 2307/102* (2013.01); *B32B 2605/08* (2013.01); *B32B 2605/18* (2013.01); *D06M 2101/20* (2013.01)

(58) Field of Classification Search
    CPC ...... B32B 2264/2031; B32B 2264/307; B32B 2262/0253; B32B 2262/0292; B32B 2264/108; B32B 2307/102; B32B 2605/08; B32B 2605/18; D06M 11/74; D06M 2101/20
    See application file for complete search history.

(56) References Cited

U.S. PATENT DOCUMENTS

| | | | |
|---|---|---|---|
| 5,281,470 A | 1/1994 | Kobayashi | |
| 5,304,415 A | 4/1994 | Kurihara | |
| 5,332,426 A | 7/1994 | Tang | |
| 5,905,234 A | 5/1999 | Tsukamoto | |
| 5,952,248 A | 9/1999 | Horton | |
| 6,617,002 B2 | 9/2003 | Wood | |
| 6,977,109 B1 | 12/2005 | Wood | |
| 7,279,440 B2 | 10/2007 | Berrigan | |
| 7,731,878 B2 | 6/2010 | Wood | |
| 8,748,693 B2 | 6/2014 | Westwood | |
| 8,906,815 B2 | 12/2014 | Moore | |
| 2006/0183812 A1 | 8/2006 | Miller | |
| 2008/0038976 A1* | 2/2008 | Berrigan | D04H 3/16 442/221 |
| 2008/0135327 A1* | 6/2008 | Matsumura | E01F 8/0011 181/294 |
| 2010/0216211 A1* | 8/2010 | Shauer | D01F 11/00 428/221 |
| 2012/0279799 A1* | 11/2012 | Graf | B32B 15/20 181/290 |
| 2013/0153331 A1* | 6/2013 | Schneider | E04B 1/8409 181/292 |
| 2014/0287644 A1 | 9/2014 | Lee | |
| 2015/0008281 A1 | 1/2015 | Perazzolo | |
| 2016/0111076 A1 | 4/2016 | Qian | |
| 2016/0298266 A1 | 10/2016 | Zillig | |
| 2016/0313015 A1 | 10/2016 | Uhlenbusch | |
| 2017/0132999 A1 | 5/2017 | Coakley | |
| 2017/0152994 A1 | 6/2017 | Coakley | |
| 2017/0182858 A1 | 6/2017 | Coakley | |

FOREIGN PATENT DOCUMENTS

| | | | |
|---|---|---|---|
| CN | 103722829 | 4/2014 | |
| CN | 105156533 | 12/2015 | |
| CN | 105252852 | 1/2016 | |
| CN | 204998073 | 1/2016 | |
| CN | 205075423 | 3/2016 | |
| CN | 112218697 | * 1/2021 | ......... B01D 39/1623 |
| DE | 3934555 | 4/1991 | |
| EP | 2251858 | 11/2010 | |
| JP | 04194244 | 7/1992 | |
| JP | 07140985 | 6/1995 | |
| JP | 07145610 | 6/1995 | |
| JP | 0839596 | 2/1996 | |
| JP | 08123431 | 5/1996 | |
| JP | 08199778 | 8/1996 | |
| JP | 0962268 | 3/1997 | |
| JP | 09170276 | 6/1997 | |
| JP | 10121598 | 5/1998 | |
| JP | 2001348820 | 12/2001 | |
| JP | 5893944 | 3/2016 | |
| KR | 20150005003 | 1/2015 | |
| WO | WO 1997-020091 | 6/1997 | |
| WO | WO 2007-047263 | 4/2007 | |
| WO | WO 2008-004432 | 1/2008 | |
| WO | 2009088648 A1 | 7/2009 | |
| WO | WO 2011-112311 | 9/2011 | |
| WO | WO 2013-007243 | 1/2013 | |
| WO | WO 2015-004191 | 1/2015 | |
| WO | WO 2015-193671 | 12/2015 | |
| WO | WO-2015193671 A1 * | 12/2015 | ........... G10K 11/168 |
| WO | WO 2016-040431 | 3/2016 | |
| WO | WO 2016-113241 | 7/2016 | |
| WO | WO 2017-076979 | 5/2017 | |
| WO | WO 2019-005858 | 1/2019 | |

OTHER PUBLICATIONS

"2017 and Later Model Year Light Duty Vehicle Greenhouse Gas Emissions and Corporate Average Fuel Economy Standards: EPA Response to Comments", *United States Environmental Protection Agency*, 2012, pp. 1-1427.

"AlphaSorb® Pro Acoustic Panel Room Kit", *Acoustical Solutions, Technical Data Sheet*, URL <https://acousticalsolutions.com/wp-content/uploads/2015/08/AS-AlphaSorb-Pro-Acoustic-Room-Kit-Data-Sheet.pdf>, 2016, p. 1.

"Echo Barrier, The Industry's First Reusable, Indoor / Outdoor Noise Barrier / Absorber", Acoustical Surfaces, [retrieved from the internet on Jun. 13, 2020], URL <https://www.acousticalsurfaces.in/echo-barrier.php>, 2020, pp. 1-2.

"Light-Duty Automotive Technology and Fuel Economy Trends: 1975 through 2005", *Office of Transportation and Air Quality, United States Environmental Protection Agency, Executive Summary*, 2005, pp. 1-9.

"PolyPhon™ Polyester Acoustic Panels", *Acoustical Solutions, Technical Data Sheet*, URL <https://acousticalsolutions.com/wp-content/uploads/2015/01/as-polyphon-polyester-acoustic-panels-data-sheet.pdf>, 2018, p. 1.

Bechwati, "Low Frequency Sound Propagation In Activated Carbon", *Journal of the Acoustical Society of America*, 2012, vol. 132, No. 01, pp. 239-248.

Castillo, "Microstructure Influence on Acoustical Properties of Multi-Scale Porous Materials", *School of Computing, Science and Engineering, University of Salford*, 2011, pp. 1-361.

Fenner, "Principles of Polymer Processing", *Chemical Publishing*, 1979, pp. 77-84.

Gerdes, "Numerical Modeling of the Damping Effect of Fibrous Acoustical Treatments," *Society of Automotive Engineers*, 2001, pp. 1-8.

Herdtle, "Transfer Impedance of Microperforated Materials With Tapered Holes," *Journal of the Acoustical Society of America*, 2012, pp. 1-40.

Karpinski, "Sound Propagation in Activated Carbon Felts", *Inter-Noise*, 2016, pp. 4054-4059.

Kim, "Structural Damping By the Use of Fibrous Materials," *Technical Paper, Society of Automotive Engineers*, 2015, pp. 1-27.

Kurosawa, "Effect of Sound Insulation By Adhesion of Laminated Sound Insulation Materials", *The Japan Society of Mechanical Engineers*, 2016, pp. 1-12.

Maa, "Microperforated-Panel Wideband Absorbers," *Noise Control Engineering Journal*, 1987, vol. 29, No. 03, pp. 77-84.

(56) References Cited

OTHER PUBLICATIONS

Maa, "Potential of Microperforated Panel Absorber", *Journal of the Acoustical Society of America*, 1998, vol. 104, No. 05, pp. 2861-2866.
Maa, "Theory and Design of Microperforated Panel Sound-Absorbing Constructions," *Scientia Sinica*, 1975, vol. 18, No. 01, pp. 55-71.
Sapriel, "Vibrations in Superlattices", *Surface Science Reports*, 1989, vol. 10, No. 4-5, pp. 189-275.
Wente, "Manufacture of Superfine Organic Fibers", Report No. 4364 *of the Naval Research Laboratories*, 1954, pp. 1-20.
Wente, "Superfine Thermoplastic Fibers", *Industrial Engineering Chemistry*, 1956, vol. 48, pp. 1342-1346.
Xiao, "Mechanical Energy Dissipation Modeling of Exfoliated Graphite Based on Interfacial Friction Theory", *Carbon*, 2016, vol. 108, pp. 291-302.
International Search Report for PCT International Application No. PCT/US2018/056671, mailed on Feb. 14, 2019, 6 pages.

\* cited by examiner

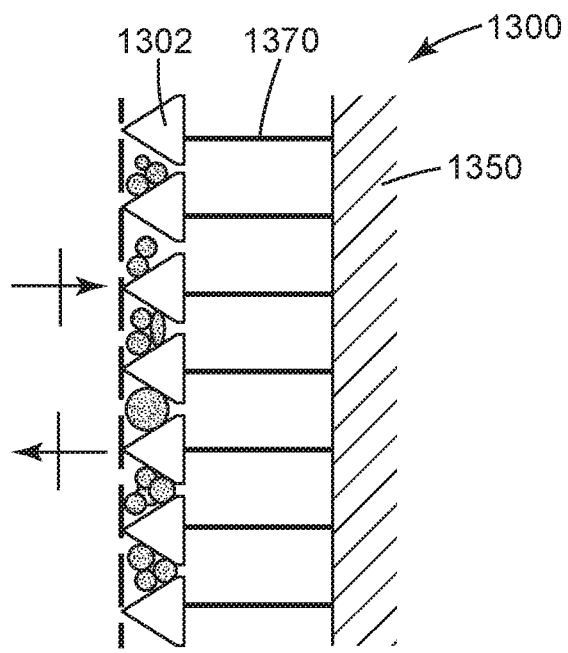
Fig. 14
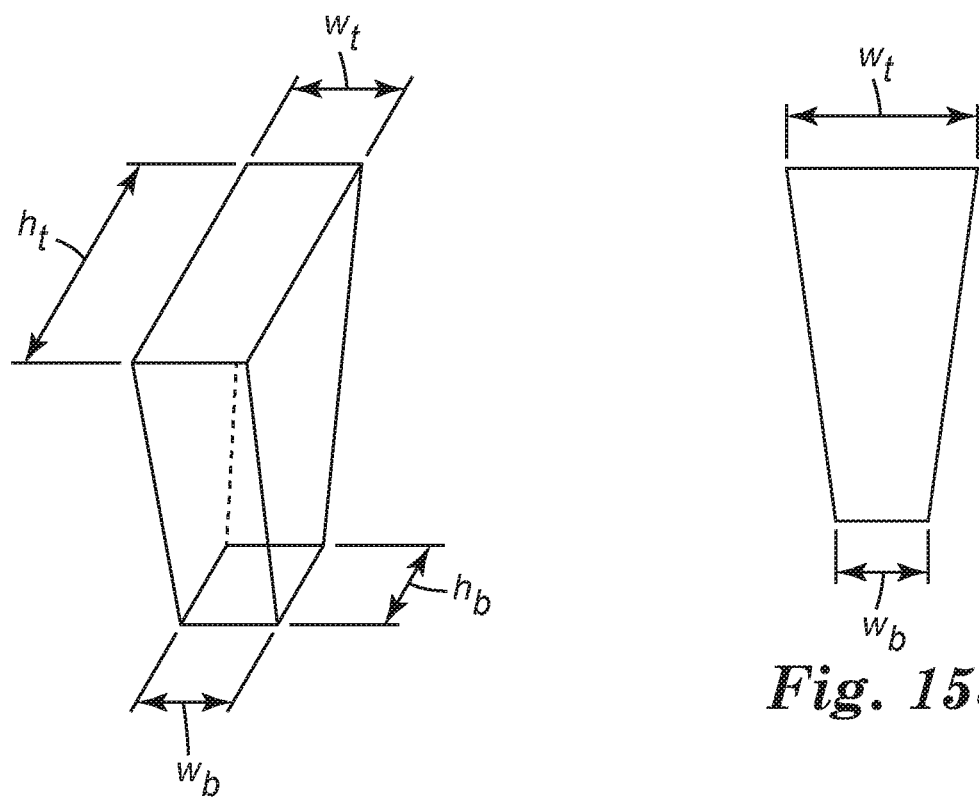
Fig. 15a
Fig. 15b

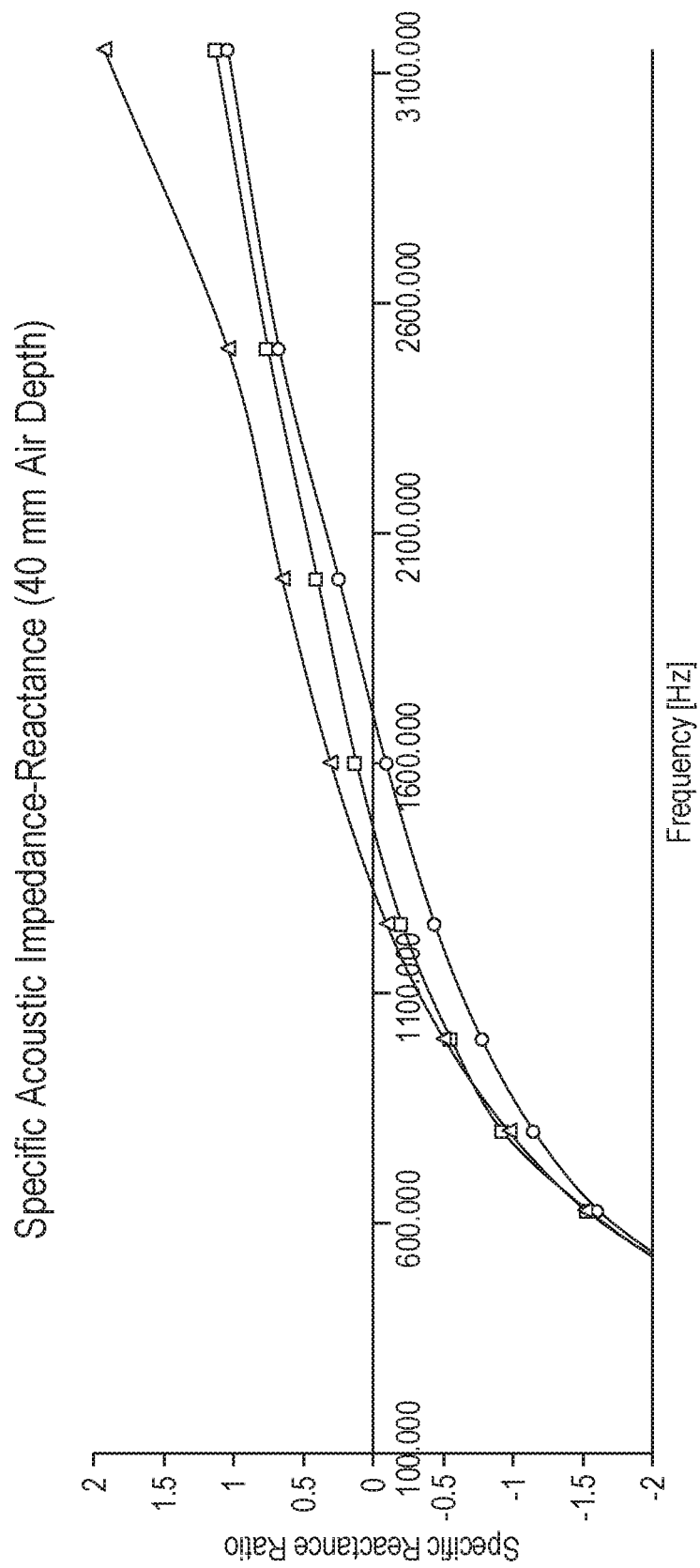

ACOUSTIC ARTICLE AND RELATED METHODS

CROSS REFERENCE TO RELATED APPLICATIONS

This application is a national stage filing under 35 U.S.C. 371 of PCT/US2018/056671 filed 19 Oct. 2018, which claims the benefit of U.S. Provisional Patent Application No. 62/574,509, filed 19 Oct. 2017, the disclosures of which are incorporated by reference in their entirety herein.

FIELD OF THE INVENTION

Described herein are acoustic articles suitable for use in thermal and acoustic insulation. The provided acoustic articles can be particularly suitable for reducing noise in automotive and aerospace applications.

BACKGROUND

Historically, developments in automotive and aerospace technology have been driven by consumer demands for faster, safer, quieter, and more spacious vehicles. These attributes must be counterbalanced against the desire for fuel economy, since enhancements to these consumer-driven attributes generally also increase the weight of the vehicle.

With a 10% weight reduction in the vehicle capable of providing about an 8% increase in fuel efficiency, automotive and aerospace manufacturers have a great incentive to decrease vehicle weight while meeting existing performance targets. Yet, as vehicular structures become lighter, noise can become increasingly problematic. Some noise is borne from structural vibrations, which generate sound energy that propagates and transmits to the air, generating airborne noise. Structural vibration is conventionally controlled using damping materials made with heavy, viscous materials. Airborne noise is conventionally controlled using a soft, pliable material, such as a fiber or foam, capable of absorbing sound energy.

Structural-borne and airborne noises can be mitigated by a technique called nearfield damping. The nearfield region is defined as the region close to the surface of the vibrating structure, where air sloshes back and forth laterally along the panel. The nearfield region can be modified using an acoustic absorber, where sound energy is dissipated by the viscous interaction of the fluid and the fibers. Such dissipation can significantly reduce noise, vibration, and harshness experienced by vehicle occupants.

SUMMARY

Known airborne acoustic absorbers can perform well at high sound frequencies but generally perform poorly at low sound frequencies (<800 Hz). Conventionally, this technical problem has been addressed by increasing the thickness of the absorber or adding a heavy barrier layer. Each of these options, however, can significantly increase the overall weight and thickness of the absorber. Described herein is an alternative solution that involves disposing acoustic particles of high porosity into one or more engineered porous layers to obtain a thin and lightweight acoustic article that can achieve significant acoustic absorption at both high and low frequencies.

Acoustic particles based on porous carbon are capable of having enormous surface area per unit weight. In addition to its large surface area, activated carbon instantaneously adsorbs and desorbs gas molecules onto and off of its surface. While not intending to be bound by theory, it is believed that adsorption and desorption properties of activated carbon change the dynamic bulk modulus of the air to lower the speed of sound through the acoustic media. These characteristics result in very good low frequency sound absorption performance. For example, 50% of normal incidence sound absorption can be achieved at 200 Hz with certain size and amount of activated carbon.

Reduction of the speed of sound has the effect of shortening the acoustic wavelength. Therefore, if a suitable amount of suitably sized acoustic particles is used in combination with acoustic absorbing material, the low frequency sound absorption (below 600 Hz) can be achieved with relatively thin layer of absorbing material.

Various types of porous layers can benefit from the addition of these acoustic particles. One type is based on a non-woven fibrous layer which, at sufficient densities, can provide broadband absorption by dissipating sound wave energy along fiber surfaces. Another type of porous layer is based on a film having a multiplicity of tiny apertures, or perforations. Perforated film dissipates sound energy through friction between the walls of the perforations and the plugs of air that vibrate within them. Porous layers based on open-celled foams and particulate beds are also possible. These materials benefit from the inclusion of high surface energy particles, which surprisingly can enhance low frequency performance without significantly compromising high frequency performance, thickness or weight.

In a first aspect, an acoustic article is provided. The acoustic article comprises: a porous layer; and heterogeneous filler in contact with the porous layer, the heterogeneous filler comprising porous carbon and having an average surface area of from 0.1 $m^2/g$ to 10,000 $m^2/g$, wherein the acoustic article has a flow resistance of from 100 MKS Rayls to 5000 MKS Rayls. Optionally, the porous layer comprises a non-woven fibrous layer having a plurality of fibers, the heterogeneous filler being at least partially enmeshed in the plurality of fibers. Optionally, the porous layer comprises a perforated film having a plurality of apertures with an average narrowest diameter of from 30 micrometers to 5000 micrometers, wherein the heterogeneous filler extends in a layer across the perforated film.

In a second aspect, a method of making an acoustic article is provided comprising: disposing a heterogeneous filler comprising porous carbon into a porous layer, the heterogeneous filler having an average surface area of from 0.1 $m^2/g$ to 10,000 $m^2/g$ to increase acoustical absorption of the acoustic article at sound frequencies of from 50 Hz to 2,000 Hz.

In a third aspect, an acoustic assembly is provided comprising the aforementioned acoustic article.

In a fourth aspect, a method of using the aforementioned acoustic article, comprising: disposing the acoustic article proximate to a surface to damp vibrations of the surface.

In a fifth aspect, a method of using the aforementioned acoustic article, comprising: disposing the acoustic article proximate to an air cavity to absorb sound energy being transmitted through the air cavity.

BRIEF DESCRIPTION OF THE DRAWINGS

As provided herein:

FIGS. 9-14 are enlarged side cross-sectional views of acoustic assemblies according to various embodiments.

FIGS. 15a, 15b, and 15c show aperture dimensions for a perforated film in an exemplary acoustic article.

FIG. 19 is a specific acoustic impedance plot comparing the reactance-part of impedance of exemplary acoustic articles and a comparative acoustic article.

Figure 1:
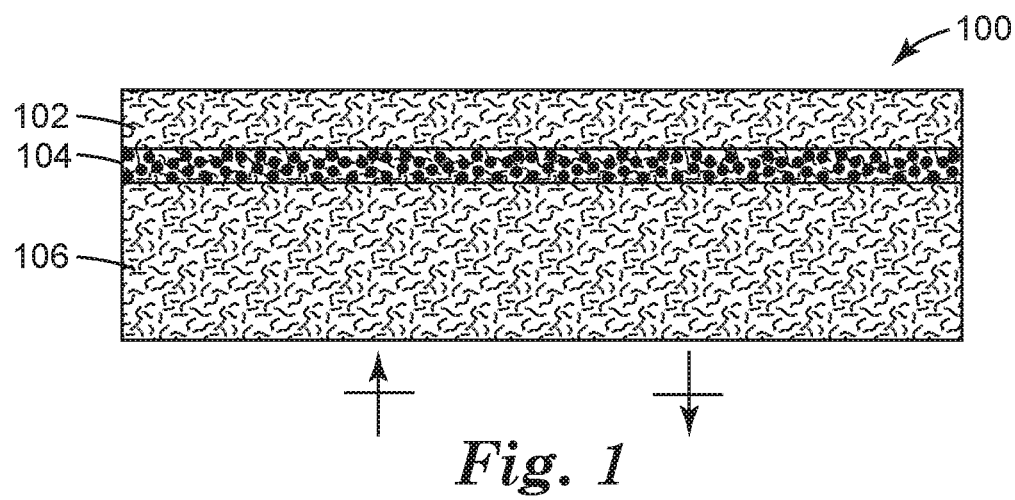
FIGS. 1-4 are side cross-sectional views of multilayered acoustic articles according to various embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The drawings may not be to scale.

Definitions

As used herein:

"Average" means number average, unless otherwise specified.

"Basis Weight" is calculated as the weight of a 10 cm×10 cm web sample multiplied by 100, and is expressed in grams per square meter (gsm).

"Copolymer" refers to polymers made from repeat units of two or more different polymers and includes random, block and star (e.g. dendritic) copolymers.

"Dimensionally stable" refers to a structure that substantially holds its shape under gravity unassisted (i.e., not floppy).

"Die" means a processing assembly including at least one orifice for use in polymer melt processing and fiber extrusion processes, including but not limited to melt-blowing.

"Discontinuous" when used with respect to a fiber or plurality of fibers means fibers having a limited aspect ratio (e.g., a ratio of length to diameter of e.g., less than 10,000).

"Enmeshed" means that particles are dispersed and physically and/or adhesively held in the fibers of the web.

"Glass transition temperature (or $T_g$)" of a polymer refers to a temperature at which there is a reversible transition in an amorphous polymer (or in an amorphous region within a semi crystalline polymer) from a hard and relatively brittle "glassy" state into a viscous or rubbery state as the temperature is increased.

"Median fiber diameter" of fibers in a non-woven fibrous layer is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Non-woven fibrous layer" means a plurality of fibers characterized by entanglement or point bonding of the fibers to form a sheet or mat exhibiting a structure of individual fibers or filaments which are interlaid, but not in an identifiable manner as in a knitted fabric.

"Oriented" when used with respect to a fiber means that at least portions of the polymer molecules within the fibers are aligned with the longitudinal axis of the fibers, for example, by use of a drawing process or attenuator upon a stream of fibers exiting from a die.

"Particle" refers to a small distinct piece or individual part of a material in finely divided form. A particle may also include a collection of individual particles associated or clustered together in finely divided form. Thus, individual particulates used in certain exemplary embodiments of the present disclosure may clump, physically intermesh, electrostatically associate, or otherwise associate to form particulates. In certain instances, particulates in the form of agglomerates of individual particulates may be formed as described in U.S. Pat. No. 5,332,426 (Tang et al).

"Polymer" means a relatively high molecular weight material having a molecular weight of at least 10,000 g/mol.

"Porous" means air-permeable.

"Shrinkage" means reduction in the dimension of a fibrous non-woven layer after being heated to 150° C. for 7 days based on the test method described in U.S. Patent Publication No. 2016/0298266 (Zillig et al.);

"Size" refers to the longest dimension of a given object or surface.

"Substantially" means a majority of, or mostly, as in an amount of at least 50%, 60, 70, 80, 90, 95, 96, 97, 98, 99, 99.5, 99.9, 99.99, or 99.999%, or 100%.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

The present disclosure is directed to acoustic articles, assemblies, and methods thereof that function as acoustic absorbers, vibration dampeners, and/or acoustic and thermal insulators. The acoustic articles and assemblies generally include one or more porous layers and one or more heterogeneous fillers in contact with the one or more porous layers. Optionally, the provided acoustic articles and assemblies include one or more non-porous barrier layers and/or air gaps adjacent to the one or more porous layers. Structural and functional characteristics of each of these components are described in the subsections that follow.

Porous Layers

The provided acoustic articles include one or more porous layers. Useful porous layers include, but are not limited to, non-woven fibrous layers, perforated films, particulate beds, open-celled foams, fiberglass, nets, woven fabrics, and combinations thereof.

Engineered non-woven fibrous layers containing fine fibers can be effective sound absorbers in aerospace, automotive, shipping, and building applications. Non-woven materials having a plurality of fine fibers can be especially effective at high sound frequencies, a regime in which the high surface area of the structure promotes viscous dissipation of sound energy. Non-woven layers may be made from fiberglass. Polymeric non-woven layers can be made, for example, by melt blowing or melt spinning.

In melt-blowing, one or more thermoplastic polymer streams are extruded through a die containing closely arranged orifices and attenuated by convergent streams of hot air at high velocities to form fine fibers. These fine fibers can be collected on a surface to provide a melt-blown non-woven fibrous layer. Depending on the operating parameters chosen, e.g., degree of solidification from the molten state, the collected fibers may be semi-continuous or essentially discontinuous. In certain exemplary embodiments, the melt-blown fibers of the present disclosure may be oriented on a molecular level. The fibers can be interrupted by defects in the melt, crossing of formed filaments, excessive shear due to turbulent air used in attenuating the fibers or other events occurring in the formation process. They are generally understood to be as semi-continuous or having the length much longer than the distance between fiber entanglements so that individual fibers cannot be removed from the fiber mass intact end-to-end.

In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spun-bonded," whereby a web comprising a set of melt spun fibers are collected as a fibrous web and optionally subjected to one or more bonding operations to fuse the fibers to each other. Melt-spun fibers are generally larger in diameter than melt-blown fibers.

The fibers can be made from a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or copolymer or blend thereof in an amount of at least 35% by weight, based on the overall weight of the plurality of fibers. Suitable fibers materials also include elastomeric polymers.

Non-woven layers based on aliphatic polyester fibers can be especially advantageous in resisting degradation or shrinkage at high temperature applications. Molecular weights for useful aliphatic polyesters can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

The melt-blown or melt-spun fibers of the non-woven fibrous layer can have any suitable diameter. The fibers can have a median diameter of from 0.1 micrometers to 10 micrometers, from 0.3 micrometers to 6 micrometers, from 0.3 micrometers to 3 micrometers, or in some embodiments, less than, equal to, or greater than 0.1 micrometers, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 25, 27, 30, 32, 35, 37, 40, 42, 45, 47, or 50 micrometers.

Optionally, at least some of the plurality of fibers in the non-woven fibrous layer are physically bonded to each other or to the heterogeneous filler. Conventional bonding techniques using heat and pressure applied in a point-bonding process or by smooth calendar rolls can be used, though such processes may cause undesired deformation of fibers or compaction of the web. Optionally, attachment between fibers or between fiber and the heterogeneous filler may be achieved by including melty fibers or binder fibers within the non-woven fibrous layer.

Other techniques for bonding the fibers is taught in, for example, U.S. Patent Publication No. 2008/0038976 (Berrigan et al.) and U.S. Pat. No. 7,279,440 (Berrigan et al.). One technique involves subjecting the collected web of fibers and fibers to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, two different kinds of molecular phases are present within the fibers. For example, a predominantly semi-crystalline phase may co-exist with a predominantly amorphous phase. As another example, a predominantly semi-crystalline phase may co-exist with a phase containing domains of lower crystalline order (e.g., one in which the polymers are not chain-extended) and domains that are amorphous, the overall degree of order being insufficient for crystallinity. Such fibers can also be processed under heat as above to form a non-woven fibrous layer.

In some embodiments, the fibers of the non-woven fibrous layer do not substantially melt or lose their fiber structure during the bonding operation, but remain as discrete fibers with their original fiber dimensions.

In some embodiments, the fiber polymers display high glass transition temperatures, which can be desirable for use in high temperature applications. Certain non-woven fibrous layers shrink significantly when heated to even moderate temperatures in subsequent processing or use, such as use as a thermal insulation material. Such shrinkage has been shown to be problematic when the melt-blown fibers include thermoplastic polyesters or copolymers thereof, and particularly those that are semi-crystalline in nature.

In some embodiments, the provided non-woven fibrous layers have at least one densified layer adjacent to a layer that is not densified. Either or both of the densified and non-densified layers may be loaded with heterogeneous filler. It can be cost effective for the densified layer and adjacent non-densified layer to be prepared from a unitary layer of non-woven fibrous layer having a uniform density. The provided methods can, if desirable, provide a densified layer that has a uniform distribution of polymeric fibers throughout the layer. Alternatively, the distribution of polymeric fibers can be intentionally made non-uniform across a major surface of the non-woven fibrous layer, whereby the acoustic response can be tailored based on its location along the major surface.

In some embodiments, the median fiber diameters of the densified and non-densified portions of the non-woven fibrous layer are substantially the same. This can be realized, for example, by way of a process capable of fusing the fibers to each other in the densified region without significant melting of the fibers. Avoidance of melting the fibers can preserve the acoustic benefit that derives from the high surface area produced within the densified layer of the non-woven fibrous layer.

Engineered non-woven fibrous layers can display numerous advantages, some of which are unexpected. These materials can be used in thermal and acoustic insulation applications at high temperatures where conventional insulation materials would thermally degrade or fail. Particularly demanding are automotive and aerospace vehicle applications, where insulation materials operate in environments that are not only noisy but can reach extreme temperatures.

The provided non-woven layers can resist shrinkage at temperatures as high as 150° C. or greater, as might be encountered in automotive and aerospace applications. Shrinkage can result from crystallization during heat exposure or processing, and is generally undesirable because it can degrade acoustic performance and impact the structural integrity of the product. The provided non-woven fibrous layers can exhibit a Shrinkage after being heated to 150° C. for 7 days, as measured using the Shrinkage test method described in U.S. Patent Publication No. 2016/0298266 (Zillig et al.), of less than 15%, 14%, 13%, 12%, 11%, 10%, 9%, 8%, 7%, 6%, 5%, 4%, 3%, 2% or 1%. Such Shrinkage values can apply along both the machine and cross-web directions. In some embodiments, disposing heterogeneous filler into the interstices of non-woven layer can further reduce the degree of shrinkage at high temperatures.

As a further advantage, the densified layer can enable the non-woven fibrous layers to be thermally molded into three-dimensional structures that are dimensionally stable. Articles and assemblies based on such structures can be shaped to fit substrates having customized three-dimensional shapes. Customizing the shape of the article or assembly for a particular application optimizes use of space and simplifies attachment to, for example, an automotive or aerospace component. Because these shaped structures are dimensionally stable, these articles and assemblies also reduce the risk of de-lamination compared with conventional acoustic and thermal insulation products, which have the tendency to spring back to their original, planar configuration.

Yet another advantage relates to the ability to make non-woven fibrous layers that not only operate at high temperatures and are dimensionally stable but are also retain a high density of surface area within both densified and non-densified portions of the web. Retention of high surface area provided by the fibers, in combination with heterogeneous filler having a high surface area, enables even a very small weight of material to accomplish a high level of performance as an acoustic absorber. Surface area is relevant because the ability of the non-woven fibrous layer to dissipate noise is based on viscous dissipation at the fiber surfaces, where kinetic energy of sound pressure waves is converted into heat.

When manufacturing non-woven fibrous webs from a single layer, fewer processing and web handling steps are necessary compared with processes used to manufacture articles containing multiple layers. Reducing the number of layers in the end product, while preserving its performance properties, simplifies manufacturing and reduces associated costs.

In some embodiments, one or more additional fiber populations are incorporated into the non-woven fibrous layer. Differences between fiber populations can be based on, for example, composition, median fiber diameter, and/or median fiber length.

In some embodiments, a non-woven fibrous layer can include a plurality of first fibers having a median diameter of less than 10 micrometers and a plurality of second fibers having a median diameter of at least 10 micrometers. For various reasons, it can be advantageous to have fibers of different diameters. Inclusion of the thicker second fibers can improve the resiliency of the non-woven fibrous layer, crush resistance, and help preserve the overall loft of the web. The second fibers can be made from any of the polymeric materials previously described with respect to the first fibers and may be made from a melt blown or melt spun process.

The fibers of the non-woven layer can have any suitable fiber diameter to provide desirable mechanical, acoustic, and/or thermal properties. For example, either or both of the first and second fibers can have a median fiber diameter of at least 10 micrometers, from 10 micrometers to 60 micrometers, from 20 micrometers to 40 micrometers, or in some embodiments, less than, equal to, or greater than 10 micrometers, 11, 12, 13, 14, 15, 16, 17, 18, 19, 20, 22, 25, 27, 30, 32, 35, 37, 40, 45, 50, 55, or 60 micrometers.

Optionally, either or both of the first and second fibers are oriented. Oriented fibers are fibers that show significant alignment on the molecular scale. Fully oriented and partially oriented polymeric fibers are known and commercially available. Orientation of fibers can be measured in any of a number of ways, including birefringence, heat shrinkage, X-ray scattering, and modulus (see e.g., Principles of Polymer Processing, Zehev Tadmor and Costas Gogos, John Wiley and Sons, New York, 1979, pp. 77-84). Orientation of fibers in the non-woven fibrous layer can be achieved using any known method.

In some embodiments, the second fibers are staple fibers that are interspersed with the first plurality of the fibers. The staple fibers can include binder fibers and/or structural fibers. Binder fibers include, but are not limited to, any of the above-mentioned polymeric fibers. Suitable structural fibers can include, but are not limited to, any of the above-mentioned polymeric fibers, as well as inorganic fibers such as ceramic fibers, glass fibers, and metal fibers; and organic fibers such as cellulosic fibers. The blending of staple fibers into the non-woven layer is sometimes referred to as carding.

Additional options and advantages associated with combinations of the first and second fibers are described, for example, in U.S. Pat. No. 8,906,815 (Moore et al.).

Porous layers need not be fibrous in nature. For instance, the one or more porous layers use a perforated film. Perforated films are comprised of a film or wall having a multiplicity of perforations, or through-holes, extending therethrough. The perforations allow air spaces located on opposing sides of the wall to communicate with each other.

Enclosed within the perforations are plugs of air that act as mass components within a resonant system. These mass components vibrate within the perforations and dissipate sound energy from friction between the plugs of air and the walls of the perforations. Absorption of sound energy can take place with essentially zero net flow of fluid through the acoustic article.

The perforations can be provided with dimensions (e.g. perforation diameter, shape and length) suitable to obtain a desired acoustic performance over a given frequency range. Acoustic performance can be measured, for example, by reflecting sound off of the perforated film and characterizing the decrease in acoustic intensity as a result of acoustic dissipation as compared to the result from a control sample.

In the figures, the perforations are disposed along the entire surface of the perforated film. Alternatively, the wall could be only partially perforated—that is, perforated in some areas but not others. In certain instances, perforated areas of the wall can extend along longitudinal directions and be adjacent to one or more non-perforated areas—for example, the wall could have a rectangular cross-section tube with only one or two sides perforated.

The perforations can have a wide range of shapes and sizes and may be produced by any of a variety of molding, cutting or punching operations. The cross-section of the perforations can be, for example, circular, square, or hexagonal. In some embodiments, the perforations are represented by an array of elongated slits. While the perforations may have diameters that are uniform along their length, it is possible to use perforations that have the shape of a conical frustum or otherwise have side walls tapered along at least some their length. Tapering the side walls of the perforations can be advantageous, as described later, in enabling heterogeneous filler to be received within the perforations. Various perforation configurations and ways of making the same are described in U.S. Pat. No. 6,617,002 (Wood).

Optionally and as shown in the figures, the perforations have a generally uniform spacing with respect to each other. If so, the perforations may be arranged in a two-dimensional grid pattern or staggered pattern. The perforations could also be disposed on the wall in a randomized configuration where the exact spacing between neighboring perforations is non-uniform but the perforations are nonetheless evenly distributed across the wall on a macroscopic scale.

In some embodiments, the perforations are of essentially uniform diameter along the wall. Alternatively, the perforations could have some distribution of diameters. In either case, the average narrowest diameter of the perforations can be less than, equal to, or greater than 10 micrometers, 15, 20, 25, 30, 35, 40, 45, 50, 60, 70, 80, 90, 100, 110, 120, 150, 170, 200, 250, 300, 350, 400, 450, 500, 600, 700, 800, 900, 1000, 1500, 2000, 2500, 3000, 4000, or 5000 micrometers. For clarity, the diameter of non-circular holes is defined herein as the diameter of a circle having the equivalent area as the non-circular hole in plan view.

The porosity of the perforated film is a dimensionless quantity representing the fraction of a given volume not occupied by the film. In a simplified representation, the perforations can be assumed to be cylindrical, in which case porosity is well approximated by the percentage of the surface area of the wall displaced by the perforations in plan view. In exemplary embodiments, the wall can have a porosity of 0.1% to 10%, 0.5% to 10%, or 0.5% to 5%. In some embodiments, the wall has a porosity less than, equal to, or greater than 0.1%, 0.2, 0.3, 0.4, 0.5, 0.7, 1, 2, 3, 4, 5, 6, 7, 8, 9, or 10%.

The film material can have a modulus (e.g., flexural modulus) suitably tuned to vibrate in response to incident sound waves having relevant frequencies. Along with the vibrations of the air plugs within the perforations, local vibrations of the wall itself can dissipate sound energy and enhance transmission loss through the acoustic article. The flexural modulus, reflecting the stiffness, of the wall also directly affects its acoustic transfer impedance.

In some embodiments, the film comprises a material having a flexural modulus of from 0.2 GPa to 10 GPa, 0.2 GPa to 7 GPa, 0.2 GPa to 4 GPa, or in some embodiments, less than, equal to, or greater than a flexural modulus of 0.2 GPa, 0.3, 0.4, 0.5, 0.7, 1, 2, 3, 4, 5, 6, 7, 8, 9, 10, 12, 15, 17, 20, 25, 30, 35, 40, 50, 60, 70, 80, 90, 100, 120, 140, 160, 180, 200, or 210 GPa.

Suitable thermoplastic polymers typically have a flexural modulus in the range of from 0.2 GPa to 5 GPa. Addition of fibers or other fillers can, in some embodiments, increase the flexural modulus of these materials to 20 GPa. Thermoset polymers generally have a flexural modulus in the range of from 5 GPa to 40 GPa. Useful polymers include polyolefins, polyesters, fluoropolymers, polylactic acid, polyphenylene sulfide, polyacrylates, polyvinylchloride, polycarbonates, polyurethanes, and blends thereof.

Acoustic performance characteristics that can be ascribed to a plurality of perforations disposed in a flexible film are described in, for example, U.S. Pat. No. 6,617,002 (Wood), U.S. Pat. No. 6,977,109 (Wood), and U.S. Pat. No. 7,731,878 (Wood).

In some embodiments, the porous layer includes a particulate bed. The particulate bed may include particles of activated carbon, vermiform carbon, zeolite, Metal Organic Framework (MOF), perlite, alumina, glass bubbles, glass beads, and mixtures thereof. None, some, or all of the particles of the particulate bed may be heterogeneous filler that is acoustically active. The porosity of the particulate bed can be adjusted in part based on the size distribution of the particles. The particles may be in a range of from 0.1 micrometers to 2000 micrometers, from 5 micrometers to 1000 micrometers, from 10 micrometers to 500 micrometers, or in some embodiments, less than, equal to, or greater than, 0.1 micrometers, 0.5, 1, 2, 5, 10, 20, 30, 40, 50, 70, 100, 200, 300, 400, 500, 700, 1000, 1500, or 2000 micrometers.

Figure 18:
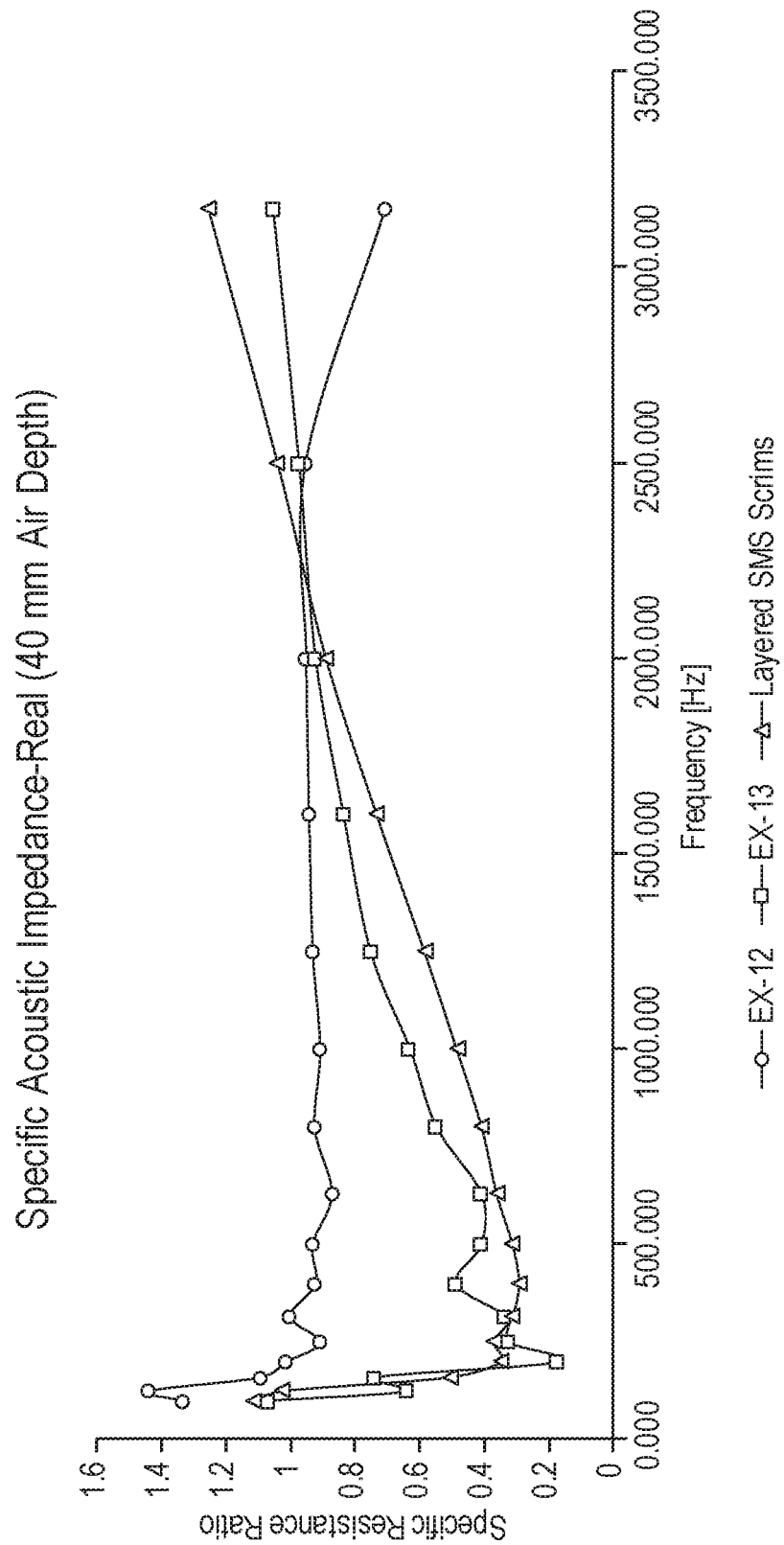
FIG. 18 is a specific acoustic impedance plot comparing the real-part of impedance of exemplary acoustic articles and a comparative acoustic article.

A porous layer can be generally characterized by its specific acoustic impedance, which is the ratio in frequency space of acoustic pressure to the associated particle speed in an acoustic medium. In the theoretical model based on a rigid film with perforations, for example, the velocity derives from air moving into and out of the holes. If the film is flexible, motion of the wall can contribute to the acoustic impedance calculation. Specific acoustic impedance varies as a function of frequency and is generally a real quantity in progressive plane wave condition, however, the specific acoustic impedance becomes a complex number under the standing plane wave or diverging wave conditions. Therefore the specific impedance of an acoustic medium reflects the fact that pressure and velocity waves can create phase mismatch between the two properties and this phase mismatch behavior reflects the acoustic absorption performance. When the two components are in phase to each other the maximum acoustic absorption is possible and vice versa when the two components are out of phase to each other. Advantageously, the provided acoustic articles and assemblies can provide a consistently high level of acoustic absorption over a wider range of frequencies than conventional acoustic absorbers (see, e.g., Examples and specific acoustic impedance ratio as shown in FIG. 18).

As used herein, specific acoustic impedance is measured in MKS Rayls, in which 1 MKS Rayl is equal to 1 pascal-second per meter (Pa·s·m-1), or equivalently, 1 newton-second per cubic meter (N·s·m-3), or alternatively, 1 kg·s-1·m-2.

A porous layer can also be characterized by its transfer impedance. For a perforated film, transfer impedance is the difference between the acoustic impedance on the incident side of the porous layer and the acoustic impedance one would observe if the perforated film were not present—that is, the acoustic impedance of the air cavity alone.

The flow resistance is the low frequency limit of the transfer impedance. Experimentally, this can be estimated by blowing a known, small velocity of air at the porous layer and measuring the pressure drop associated therewith. The flow resistance can be determined as the measured pressure drop divided by the velocity.

For embodiments that include a perforated film, the flow resistance through the perforated film alone (absent the heterogeneous filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the perforated film can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

For embodiments that include a non-woven fibrous layer, the flow resistance through the non-woven fibrous layer alone (absent the heterogeneous filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the non-woven fibrous layer can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

The flow resistance through the overall acoustic article can be from 100 MKS Rayls to 5000 MKS Rayls, 120 MKS Rayls to 3000 MKS Rayls, or 150 MKS Rayls to 1000 MKS Rayls. In some embodiments, the flow resistance through the overall acoustic article is less than, equal to, or greater than 10 MKS Rayls, 20, 30, 40, 50, 70, 100, 120, 150, 180, 200, 250, 300, 400, 500, 600, 700, 1000, 1100, 1200, 1500, 1700, 2000, 2500, 3000, 3500, 4000, 4500, 5000, 5500, 6000, 6500, 7000, 7500, or 8000 MKS Rayls.

Non Porous Layers

Optionally, the provided acoustic articles include one or more non-porous layers. Non-porous layers include barrier films that substantially prevent flow of gas therethrough, and thus do not have a release pressure effect. Barrier films can also be substantially free of porosity. Unlike flexible scrims, which move back and forth in response to a penetrating low frequency sound wave, solid films can be used to resist this low frequency movement and induce resonance in the acoustic article by reflecting the sound wave. In various embodiments, combinations of porous and non-porous layers can be used to collectively entrap and dissipate incident sound energy.

Suitable barrier films include elastomeric membranes. Examples of suitable materials can include fluoroelastomers, neoprene, and thermoplastic polyurethane. Fluoropolymer materials in general can be useful for acoustic and damping applications, as they offer a beneficial combination high density and low modulus.

Barrier films may be incorporated into a layered acoustic article using any known method. An exemplary method includes coating directly onto a porous layer. As an alternative, a barrier film may be formed separately and laminated onto one or more porous layers.

Heterogeneous Fillers

The porous layers of the acoustic article contact at least one heterogeneous filler capable of improving acoustic performance. Suitable heterogeneous fillers include porous particles, which may be characterized by open pores, closed pores, or combinations thereof. The heterogeneous filler can be rigid, such that motion of the filler material is negligible compared to that of the fluid phase (e.g., air) in an acoustical environment.

Filler particles that have open pores include zeolites, aerogels, porous alumina, mica, perlite, granulated polyurethane foam particles, metal organic frameworks (MOFs) and porous carbon materials. Filler particles with closed pores include closed cell foam particles and hollow particles. Hollow particles, which may just have a single pore (or cavity), include expanded polymeric microspheres, ceramic microspheres, and hollow glass bubbles.

The heterogeneous filler may be present in various configurations relative to the porous layer. Where the porous layer is a non-woven fibrous layer, open-celled foam, or particulate bed, for example, the heterogeneous filler may be embedded in the non-woven fibrous layer, open-celled foam, or particulate bed. Where the porous layer includes a perforated film, the heterogeneous filler may reside, at least in part, within the plurality of apertures extending through the perforated film. In some embodiments, at least 5%, at least 10%, at least 20%, at least 30%, at least 40%, at least 50%, at least 60%, at least 70%, at least 80%, at least 90%, or at least 95% of the heterogeneous filler contacting the porous layer resides within the plurality of apertures. Alternatively, the heterogeneous filler may be present as a discrete layer adjacent to the porous layer.

The porous particles can include macropores (having a width greater than 50 nanometers), mesopores (having a width less than 50 nanometers but greater than 2 nanometers), micropores (having a width less than 2 nanometers), and/or combinations of the above. Heterogeneous fillers that exemplify these features include porous carbon particles. Porous carbon particles include activated carbon and vermiform carbon.

Activated carbon is a highly porous carbonaceous material having a complex structure composed primarily of carbon atoms. The activation process can be carried out using steam at high temperatures around 1000° C., or in some cases using phosphoric acid at lower temperatures. The network of pores in activated carbons are channels created within a rigid skeleton of disordered layers of carbon atoms, linked together by chemical bonds and stacked unevenly. This creates a highly porous structure created by a multiplicity of pits and fissures within the carbon layers.

One remarkable feature of activated carbon is its ability to adsorb gas molecules. 1 $m^3$ of activated carbon with 0.3 $m^3$ of internal porosity is capable of adsorbing 30 $m^3$ or more of a gas. The behavior of porous carbon in acoustic articles has been consistent with adsorption of ambient air molecules. When porous carbon adsorbs air molecules within a confined space, the effective air volume can be over two times the air volume in the same space without porous carbon. By expanding the effective air volume within an acoustic cavity, porous carbon tends to shift the acoustic resonance frequency to low from high. This frequency shift can be interpreted as shortening of the quarter wavelength in acoustic absorption (or slowing down of speed of sound in the acoustic medium), providing for high acoustic performance in a thinner layer.

Vermiform carbon (or vermiform graphite) is a lamellar form of porous carbon made by intercalating expandable graphite with guest molecules that penetrate into the graphite layers. At elevated temperatures, the guest molecules undergo a phase change. This sudden reaction creates enough pressure to force apart the graphite layers which, if unrestricted, rapidly increases the volume of the particle. The expanded graphite has a worm-like structure known as vermiform graphite.

Vermiform graphite is notable because it has a significantly larger pore structure than activated carbon based on its lack of micropores (pores smaller than 2 nm). Vermiform carbon also has a surface area less than 1 $m^2/g$, orders of magnitude less than that of activated carbon. These differences can make vermiform carbon more effective at attenuating high frequency noise than activated carbon. As a result, it can be advantageous to use a blend of activated carbon and vermiform carbon to provide acoustic absorption over an expanded frequency range.

The average size of the particles that make up the heterogeneous filler can be relevant not only to the mechanical properties of the acoustic article but also processing considerations that affect acoustic absorption. In vermiform graphite, for example, smaller platelets produce layers with an overall higher ratio of edge area to internal volume. As particle size decreases, the expanding gas has a more efficient escape route, reducing the overall expansion potential and decreasing pore size.

The temperature at which vermiform graphite is treated was also found to affect acoustic performance, with particles treated at higher temperatures tending to exhibit a greater degree of expansion between layers. Using a spring model for the graphite layers, greater expansion is equivalent to a more flexible spring, further leading to improved acoustic damping.

Excluding agglomerates, the heterogeneous filler can have an average particle size of from 0.1 micrometers to 2000 micrometers, from 5 micrometers to 1000 micrometers, from 10 micrometers to 500 micrometers, or in some embodiments, less than, equal to, or greater than 0.1 micrometers, 0.2, 0.5, 1, 2, 5, 7, 10, 15, 20, 30, 40, 50, 70, 100, 200, 300, 400, 500, 600, 700, 800, 900, 1000, 1200, 1500, 1700, or 2000 micrometers.

Owing to its porous nature, it is possible for the heterogeneous filler to have an extremely high surface area, and consequently, adsorption capacity. Having a high surface area density can reflect a high degree of complexity and tortuosity of the pore structure, leading to greater internal reflections and energy transfer to the solid structure through frictional losses. This is manifested as absorption of airborne noise. The average surface area of the heterogeneous filler can be from 0.1 $m^2/g$ to 10,000 $m^2/g$, from 0.5 $m^2/g$ to 5000 $m^2/g$, from 1 $m^2/g$ to 2500 $m^2/g$, or in some embodiments, less than, equal to, or greater than 0.1 $m^2/g$, 0.2, 0.5, 0.7, 1, 2, 5, 10, 20, 50, 100, 120, 150, 200, 250, 300, 350, 400, 450, 500, 1000, 1500, 2000, 2500, 3000, 3500, 4000, 4500, 5000, 6000, 7000, 8000, 9000, or 10,000 $m^2/g$.

In some embodiments, the high surface density of the heterogeneous filler is attributable to the presence of exceedingly fine pores. Activated carbon, for example, displays micropores having dimensions less than 2 nm, which are responsible for the vast majority of the surface area in the carbon particles.

The heterogeneous filler can have a number average pore size of from 0.1 nanometers to 50 micrometers, from 1 nanometer to 40 micrometers, from 2.5 nanometers to 30 micrometers, or in some embodiments, less than, equal to, or greater than 0.1 nanometers, 0.2, 0.3, 0.4, 0.5, 1, 1.2, 1.5, 1.7, 2, 3, 4, 5, 7, 10, 15, 20, 25, 30, 40, 50, 70, 100, 150, 200, 250, 300, 350, 400, 450, 500, 600, 700, 800, 900 nanometers, 1 micrometer, 2, 3, 4, 5, 7, 10, 15, 20, 25, 30, 35, 40, 45, or 50 micrometers.

Heterogeneous filler particles can display minimum pore sizes that are far smaller than conventional fillers used in acoustic applications. For example, the smallest pores of activated carbon can be less than 2 nm in diameter. Vermiform carbons generally have pores that are tens of microns in diameter, but have no pores in the nanometer or sub-nanometer range. Generally, the heterogeneous filler can have a minimum pore size up to 500 nm, up to 400 nm, up to 300 nm, up to 200 nm, up to 100, up to 50, up to 20, up to 10, up to 5, up to 2, and up to 1 nm.

The heterogeneous filler can have a number average pore volume of from 0.01 $cm^3/g$ to 5 $cm^3/g$. In some embodiments, the number average pore volume can be less than, equal to, or greater than, 0.01 $cm^3/g$, 0.02, 0.05, 0.07, 0.1, 0.2, 0.3, 0.4, 0.5, 0.7, 1, 1.2, 1.4, 1.6, 1.8, 2, 2.5, 3, 3.5, 4, 4.5, or 5 $cm^3/g$.

Use of two or more different types of heterogeneous filler, as alluded to previously, can be effective in modifying the acoustic response of the composite article. In some embodiments, two or more different types of filler are blended within a porous layer of the acoustic article. In other embodiments, different types of filler are blended within a particulate bed adjacent to one or two porous layers within an acoustic article. In other embodiments, different types of filler are present but disposed in discrete layers, each independently within a porous layer or particulate bed.

If the heterogeneous filler is a particulate blend of two or more fillers, the blend can include a first heterogeneous filler having an average surface area of up to 1300 $m^2/g$ and a second heterogeneous filler having an average surface area of at least 1300 $m^2/g$. Alternatively, the blend can include a first heterogeneous filler having an average surface area of up to 500 $m^2/g$ and a second heterogeneous filler having an average surface area of at least 500 $m^2/g$. Alternatively, the blend can include a first heterogeneous filler having an average surface area of up to 100 $m^2/g$ and a second heterogeneous filler having an average surface area of at least 100 $m^2/g$. Alternatively, the blend can include a first heterogeneous filler having an average surface area of up to 10 $m^2/g$ and a second heterogeneous filler having an average surface area of at least 10 $m^2/g$.

Alternatively, or in combination, the blend can include a heterogeneous filler having a number average pore volume of up to 500 nanometers and a second heterogeneous filler having a number average pore volume of at least 500 nanometers. Alternatively, the blend can include a heterogeneous filler having a number average pore volume of up to 1 micrometer and a second heterogeneous filler having a number average pore volume of at least 1 micrometer.

As a further alternative, the filler can be comprised of two or more different filler compositions, such as combinations of activated carbon, vermiform carbon, zeolite, Metal Organic Framework (MOF), perlite, alumina, glass bubbles, and glass beads.

Acoustic Articles

Figure 2:
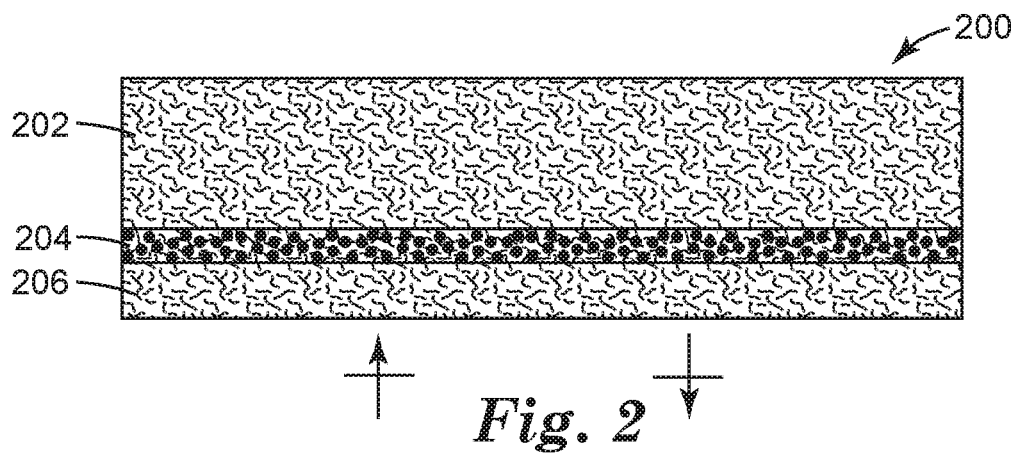
Figure 3:
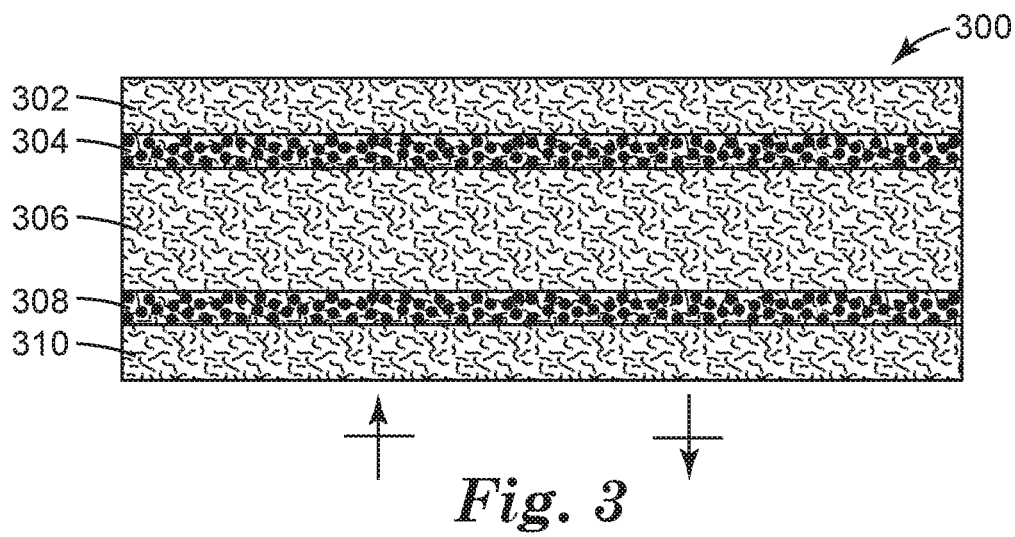

Acoustic articles according to three exemplary embodiments are illustrated in FIGS. 1-3 and hereinafter referred to by respective numerals 100, 200, and 300. As shown, each of these acoustic articles 100, 200, 300 are multilayered constructions. In FIGS. 1-3 and subsequent figures, the direction of incident and reflected sound waves are represented by barred arrows, where applicable.

The article 100 is comprised of three primary layers. The layers include, in the following order, a first porous layer 102, a second porous layer 104, and a third porous layer 106. Optionally and as shown, the porous layers 102, 104 and porous layers 104, 106 directly contact each other. In some embodiments, one or more additional layers can be disposed between these layers or extend along the exterior facing major surfaces of porous layers 102, 106. Alternatively, one or both of porous layers 102, 104 could be omitted.

In the article 100, the porous layers 102, 104, 106 are depicted as fibrous non-woven layers, but it is to be understood that other kinds of porous layers (e.g., open-celled foams, particulate beds) may be used instead, as described in detail in the sub-section above entitled "Porous layers." As indicated in FIG. 1, the second porous layer 104 contains heterogeneous filler, while the porous layers 102, 106 are substantially devoid of heterogeneous filler.

Heterogeneous filler having desirable acoustic properties, such as porous carbon, is enmeshed in the plurality of fibers in the second porous layer 104. The heterogeneous filler can be present in an amount of from 1% to 99%, 10% to 90%, 15% to 85%, 20% to 80%, or in some embodiments, less than, equal to, or greater than 1%, 2, 3, 4, 5, 7, 10, 12, 15, 20, 25, 30, 35, 40, 45, 50, 55, 60, 65, 70, 75, 80, 85, 90, 95, 97, 98, or 99% by weight relative to the overall weight of the second porous layer 104 and heterogeneous filler contacting the second porous layer 104. Particular aspects of the heterogeneous filler are described in the above sub-section entitled "Heterogeneous fillers."

Optionally, but not shown, the heterogeneous filler may be only partially enmeshed in the second porous layer 104, with some heterogeneous filler residing outside of the second porous layer 104. In some embodiments, essentially none of the heterogeneous filler is enmeshed in the second porous layer 104, and essentially all of the heterogeneous filler is present in a particulate bed of heterogeneous filler adjacent to the second porous layer 104.

Advantageously, the addition of heterogeneous filler comprised of activated carbon can substantially increase acoustical absorption of the acoustic article at low sound frequencies, such as sound frequencies of from 50 Hz to 200 Hz. In some embodiments, the addition of heterogeneous filler comprised of activated carbon can substantially increase acoustical absorption of the acoustic article over sound frequencies of less than, equal to, or greater than 50 Hz, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 400, 500, 700, 1000, 2000, 3000, 4000, 5000, 7000, or 10,000 Hz.

In the depicted embodiment, the third porous layer 106 has a thickness significantly greater than that of the first porous layer 102. FIG. 2 shows an alternative embodiment containing first, second, and third porous layers 202, 204, 206, which are analogous to those of FIG. 1, except the third porous layer 206 has a thickness significantly greater than that of the first porous layer 202.

In these constructions, one porous layer may have a thickness that is less than, equal to, or greater than 10%, 20%, 30%, 40%, 50%, 60%, 70%, 80%, 90%, 100%, 110%, 120%, 130%, 140%, 150%, 200%, 250%, 300%, 400%, 500%, 600%, 700%, 800%, 900%, or 1000% of the thickness of the other porous layer.

The provided acoustic articles preferably have an overall thickness that achieves the desired acoustic performance within the space constraints of the application at hand. An individual porous layer can have an overall thickness of from 1 micrometers to 10 centimeters, from 30 micrometers to 1 centimeter, from 50 micrometers to 5000 millimeters, or in some embodiments, less than, equal to, or greater than, 1 micrometers, 2, 5, 10, 20, 30, 40, 50, 100, 200, 500 micrometers, 1 millimeter, 2, 3, 4, 5, 7, 10, 20, 50, 70, or 100 millimeters.

The porous layers 106, 206 can serve as resistive materials that improve the low frequency performance of the total acoustic structure. The porous layers 106, 206 can also reduce acoustic particle velocity, which tends to induce reflection of the sound wave upon reaching the particle-filled porous layer 104, 204. Reflection tends to occur in this scenario because the acoustic impedance (pressure/velocity) becomes very high as velocity approaches zero. The presence of acoustic particles, however, can act as a pressure-reducing layer induced by reversible adsorption/desorption of air molecules as described previously. Reducing pressure also lowers acoustic impedance, enabling some sound to penetrate and helping entrap more sound energy within the acoustic article 100, 200, thereby improving acoustic performance.

In this embodiment, the heterogeneous filler is substantially decoupled from each other and any porous layers; that is, the particles of the heterogeneous filler are not physically attached to each other and capable of at least limited movement or oscillation independently from the surrounding structure. In these instances, the enmeshed particles can move and vibrate within the fibers of the non-woven material largely independently of the fibers themselves.

The article 300 combines features and benefits of articles 100, 200 in that it includes two porous layers 304, 308 loaded with heterogeneous filler that are sandwiched between three porous layers 302, 306, 310 that are substantially devoid of heterogeneous filler.

It is to be understood that further embodiments are also possible in which the acoustic article is comprised of six, seven, or even more porous layers, where at least one porous layer contains, or is otherwise in contact with, the heterogeneous filler.

Figure 4:
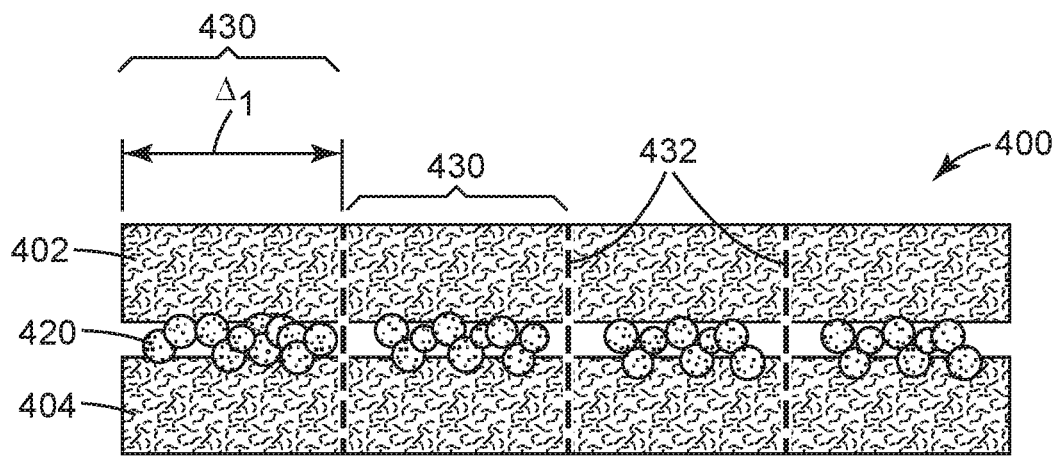
Figure 5:
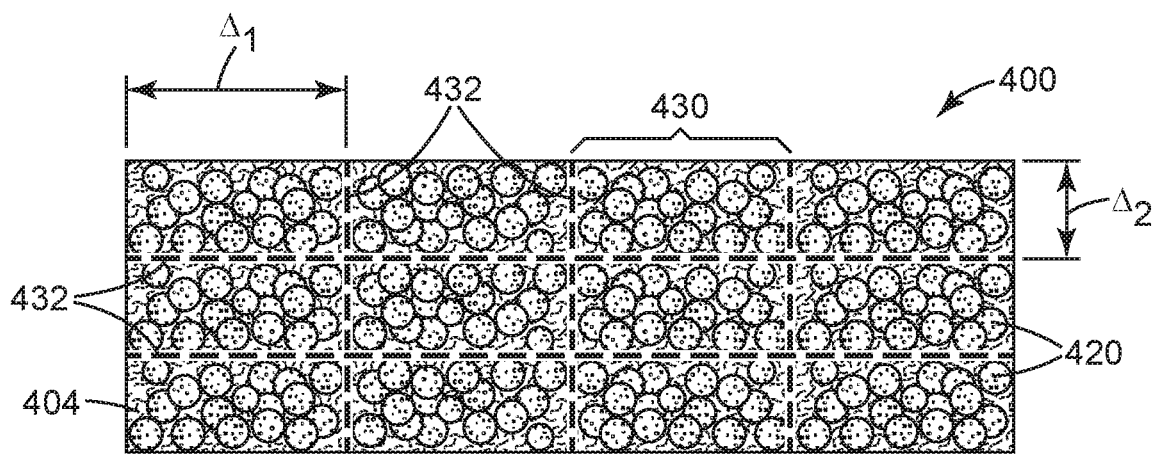
FIG. 5 is a plan view of the acoustic article of FIG. 4, with a top layer omitted for clarity.

FIG. 4 shows a side view of an acoustic article 400 that has first and second porous layers 402, 404 and a layer of heterogeneous filler 420 disposed between the first and second porous layers 402, 404. FIG. 5 shows the same article 400 in plan view, with the first porous layer 402 removed for clarity. The porous layers 402, 404 and heterogeneous filler 420 are analogous to the porous layers in FIGS. 1-3. The porous layers 402, 404 can not only contribute to acoustic performance of the article 400 but also serve to physically confine and secure the heterogeneous filler 420 to the space between the porous layers 402, 404.

A further notable aspect of the article 400 is its division into a plurality of sectioned chambers 430 by walls 432. The chambers 430 are located in transverse directions relative to each other, with each chamber 430 containing the first porous layer 402, layer of heterogeneous filler 420, and second porous layer 404 as shown. Optionally and as shown, the chambers 430 are arranged in a grid pattern in plan view.

The walls 432 separating the chambers 430 from each other are not particularly restricted in their composition, and may or may not be porous. In preferred embodiments, the walls 432 are made from a flexible polymeric membrane having a low flow resistance, a scrim, or a perforated film (such as a perforated film). Advantageously, the walls 432 can also improve acoustic performance by providing grazing wave dissipation based on the presence of the lateral boundaries within the article 400.

Referring again to FIGS. 4 and 5, the walls 432 have regular spacings $\Delta_1$ and $\Delta_2$, defined along respective orthogonal directions on the major surface of the article 400. While ideal dimensions would be dependent on the sound frequencies of interest, each of $\Delta_1$ and $\Delta_2$ can be, independently, in the range of from 0.1% to 200%, or in some embodiments, less than, equal to, or greater than 0.1%, 0.2, 0.5, 1, 2, 5, 7, 10, 15, 20, 25, 30, 40, 50, 60, 70, 80, 90, 100, 110, 120, 150, 200, 250, 300, 350, 400, 450 or 500% of the thickness of one or both of the porous layers 402, 404.

Figure 6:
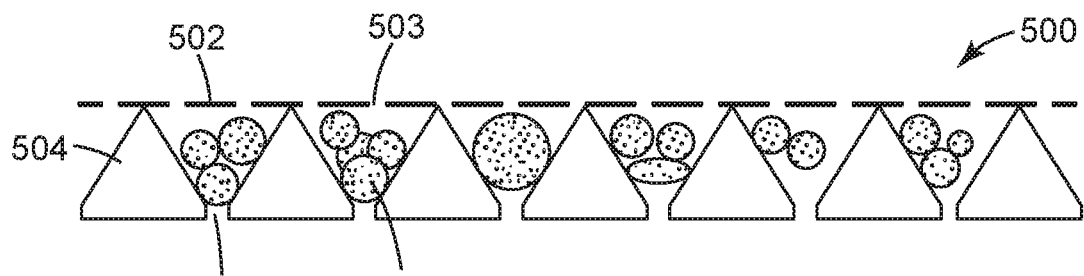
FIGS. 6-7 are enlarged side cross-sectional views of multilayered acoustic articles according to various embodiments.

FIG. 6 is directed to an acoustic article 500 based on porous layers comprised of perforated film. The acoustic article 500 has heterogeneous filler 520 confined between first and second perforated films 502, 504 (previously described under the sub-section entitled "Perforated films"). The films 502, 504 have a plurality of apertures 503, 505 (or through holes) extending through the respective films 502, 504 along directions perpendicular to the major surfaces of the article 500. Optionally, and as shown, the plurality of apertures 503, 505 are disposed in a pre-determined two-dimensional pattern having a regular center-to-center spacing between apertures 503, 505.

In the embodiment shown, the apertures 503 are generally in alignment with the aperture 505, but the films 502, 504 are otherwise not symmetric. The film 504 is significantly thicker than film 502; further, the apertures 503 are generally cylindrical while the apertures 505 have tapered side walls to produce openings that have a generally conical shape. Referring again to FIG. 6, the heterogeneous filler 520 resides within the generally conical openings, and is mechanically retained between the films 502, 504 because the particles of the heterogeneous filler 520 are significantly larger than the narrowest width of the apertures 503, 505.

The films 502, 504 can be secured to each other by any known method, including use of adhesives, thermal lamination, and mechanical couplings. Either of films 502, 504 can also be coupled to a fibrous non-woven layer as previously described using any of these methods. In some embodiments, the fibrous non-woven layer contains tacky polymeric fibers that assist in its attachment to heterogeneous filler, perforated film or another fibrous non-woven layer. Suitable tacky fibers include adhesive fibers made from, for example, styrene-isoprene-styrene or polyethylene/polypropylene copolymers.

Figure 7:
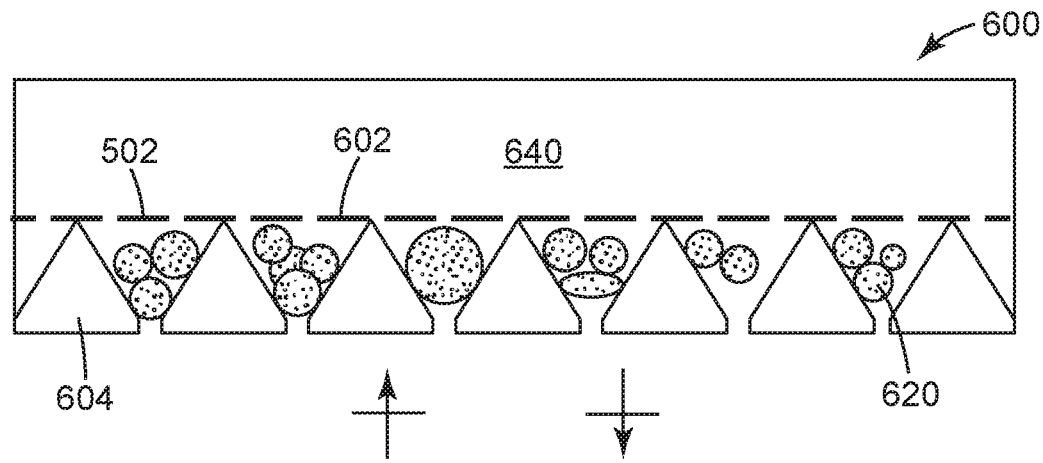

FIG. 7 shows an acoustic article 600 similar in many respects to the acoustic article 500 in that it includes first and second perforated films 602, 604 and heterogeneous filler 620 disposed therebetween. The article 600, however, differs from the prior article in that it additionally includes an enclosed air gap 640 that contacts and extends along the major surface of the acoustic article facing away from the incident sound waves, as shown. The air gap 640 provides a resonant chamber that can be sized to enhance transmission loss at particular frequencies.

The air gap 640 can acts as an acoustic resonator based on quarter wavelength theory. According to this theory, the peak acoustic absorption occurs at a frequency representing the quarter wavelength of the thickness of the acoustic layer. Larger air gaps shift the peak acoustic absorption to lower frequencies. For example, a 5-centimeter thick air gap may have a peak absorption at 1600 Hz, while a 10 cm air gap may produce a peak absorption occurring at 800 Hz.

Depending on the acoustic frequency of interest, the air gap can have a thickness of from 10 micrometers to 10 centimeters, from 500 micrometers to 5 centimeters, from 1 millimeter to 3 centimeters, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

Figure 8:
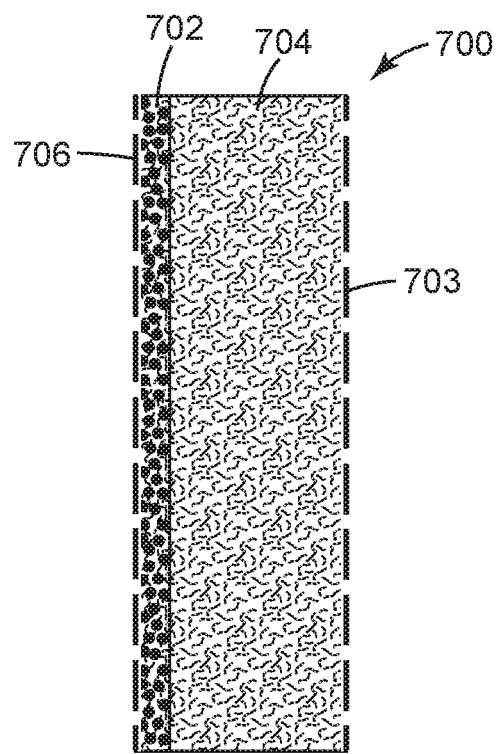
FIG. 8 is a side cross-sectional view of a multilayered acoustic articles according to another embodiment.

FIG. 8 shows an acoustic article 700 according to another multi-layered embodiment using a first fibrous non-woven layer 702 comprised of blown microfiber loaded with heterogeneous filler. The loaded non-woven layer 702 contacts a second non-woven layer 704 that does not contain heterogeneous filler. Optionally, the first non-woven layer 702 is compressed to for a densified layer having a thickness significantly smaller than that of the second non-woven layer 704. By virtue of the densification and presence of enmeshed particles, the first non-woven layer 702 can have a much greater density than that of the second non-woven layer 704. The non-woven layers 702, 704 are sandwiched between a pair of resistive scrims 706, 708.

Particle-filled layers generally have a low flow resistance (less than 50 MKS Rayls) compared with typical meltblown fibrous non-woven backings (greater than 150 MKS Rayls). Resistive scrims 706, 708 are thin porous layers that display high flow resistance (e.g., up to 2000 MKS Rayls). In some embodiments, resistive scrims 706, 708 have a thickness of less than 5000 micrometers and have negligible flexural stiffness.

Inclusion of a resistive layer, such as a resistive scrim, can provide further enhancement of acoustic performance, particularly at lower frequencies. This is due to the increased flow resistance of the overall acoustic article, and increased entrapment of sound energy within the second non-woven layer 704. A resistive layer can have a flow resistance of from 10 MKS Rayls to 5000 MKS Rayls, 20 MKS Rayls to 3000 MKS Rayls, or 50 MKS Rayls to 1000 MKS Rayls. In some embodiments, the flow resistance through the resistive layer is less than, equal to, or greater than 10 MKS Rayls, 20, 30, 40, 50, 70, 100, 200, 300, 400, 500, 600, 700, 1000, 1100, 1200, 1500, 1700, 2000, 2500, 3000, 3500, 4000, 4500, 5000, 5500, 6000, 6500, 7000, 7500, or 8000 MKS Rayls.

The resistive layer can have a thickness of from 1 micrometers to 10 centimeters, from 30 micrometers to 1 centimeters, from 50 micrometers to 5000 micrometers, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

FIGS. 9-14 each show an example of an acoustic assembly where one or more perforated films are directly or indirectly coupled to a non-acoustic structural component.

Figure 9:
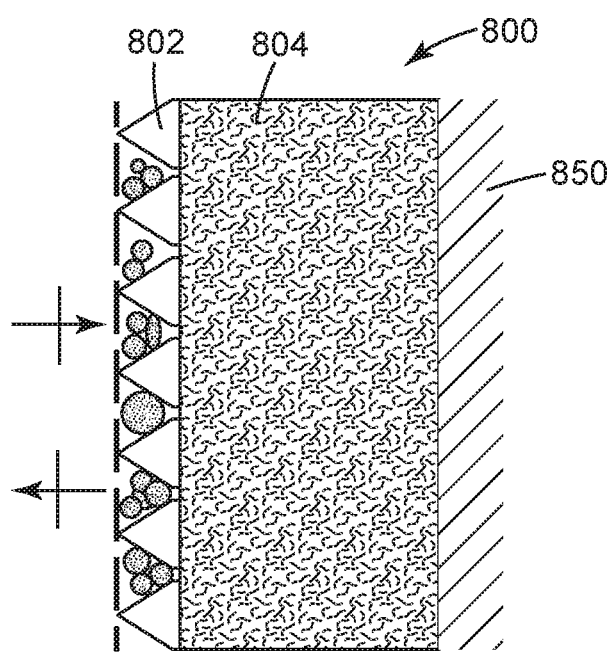

FIG. 9 shows an acoustic assembly 800 having a perforated film 802 loaded with heterogeneous filler adjacent to a fibrous non-woven layer 804 that is substantially devoid of heterogeneous filler. As shown, incident sound waves initially contact the perforated film 802. Opposite the perforated film 802, the fibrous non-woven layer 804 extends across and contacts a primary structure 850.

Figure 10:
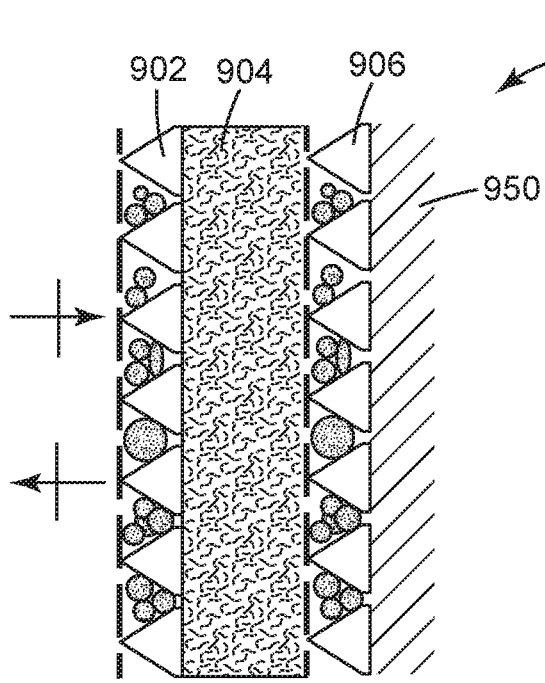

FIG. 10 shows an acoustic assembly 900 with a pair of acoustic articles 902, 906, each acoustic article 902, 906 including a pair of perforated films with heterogeneous filler disposed between them as exemplified previously in FIG. 6. Extending between the acoustic articles 902, 906 is a fibrous non-woven layer 904 that is that is substantially devoid of heterogeneous filler. As shown, the acoustic article 902 faces incident sound waves, while the acoustic article 906 contacts primary structure 950.

Figure 11:
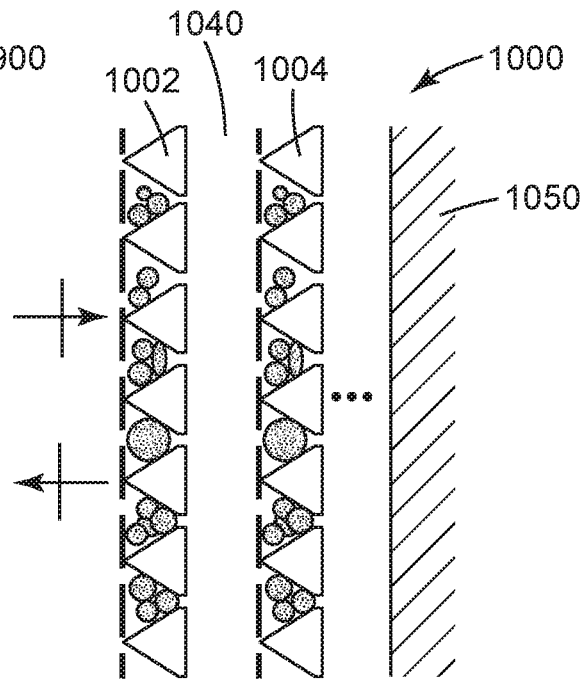

FIG. 11 shows an acoustic assembly 1000 having at least a first and second acoustic articles 1002, 1004 spaced apart from each other by an air gap 1040. As shown, any number of additional acoustic articles may be interposed between the acoustic articles 1002, 1004 and a primary structure 1050. Advantageously, the perforated films within the assembly 1000 may have aperture dimensions, spacings, and arrangements that are different from each other to provide a customized acoustic response to known sound frequencies. Incident sound waves initially contact acoustic article 1002 as shown, but these sound waves can propagate through any and all of the films in the assembly 1000.

Figure 12:
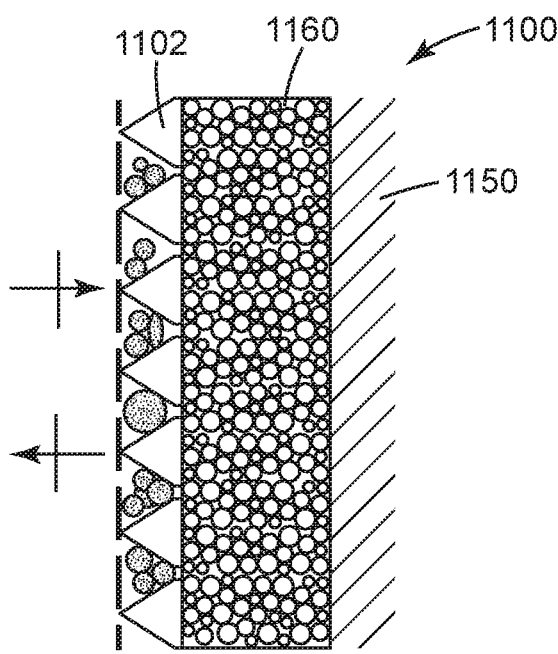

FIG. 12 shows an acoustic article 1100 having an acoustic article 1102 and a particulate bed 1160. The particulate bed 1160 is comprised of a second heterogeneous filler, which is captured in the gap defined between the acoustic article 1102 and a primary structure 1150. The first and/or second heterogeneous filler comprises acoustically-active porous particles, such as activated carbon or vermiform carbon particles. Particulate beds can be advantageous for certain acoustic applications because beds can have a density of 0.4 g/cc and higher, providing significantly greater mass than typically found in fibrous non-woven layers.

Figure 13:
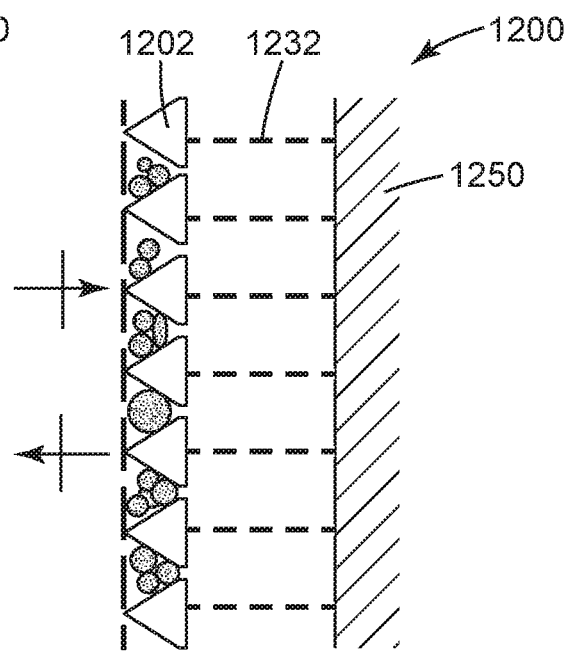

FIG. 13 shows an acoustic assembly 1200 in which an acoustic article 1202 is loaded with heterogeneous filler and spaced apart from a primary structure 1250. One side of the acoustic article 1202 faces incident sound waves, while the opposing side faces primary structure 1250. The acoustic article 1202 is connected to the primary structure 1250 by a series of enclosed acoustic chambers (analogous to those shown in FIGS. 4-5) which are in turn defined by a plurality of walls 1232. Each wall 1232 is oriented along a plane that is generally perpendicular to the acoustic article 1202. The walls 1232 are made from perforated film and provide additional grazing flow dissipation.

FIG. 14 shows an acoustic assembly 1300 where an acoustic article 1302 is spaced apart from a primary structure 1350. The acoustic article 1302 is coupled to the primary structure 1350 by a plurality of stand offs 1370. The stand offs 1370 are solid as shown and can provide a structural damping effect in response to vibrations in the primary structure 1350.

In some embodiments, the acoustic articles above can be engineered for use in applications that demand the properties of both an acoustic barrier and an acoustic absorber simultaneously. Conventional porous acoustic absorbers lack the acoustic barrier performance, which means poor sound transmission loss performance, due to high porosity requirement for acoustic absorption. In prior approaches, two different treatments were used for these applications; for example, an absorber treatment would be used to dissipate the acoustic energy and a barrier treatment used to block transmission of sound energy.

One simple way to improve the barrier performance of the nonwoven fibrous material is to increase the air flow resistance of the material. However, if we take this route, it is very likely that the material will lose its acoustic absorption performance since both the level of the porosity through the material and the viscous dissipation of the acoustic pressure will be reduced. To obtain reasonable absorption and barrier performance at the same time, it is possible to retain a certain level of porosity through the material while increasing air flow resistance.

As shall be shown in the forthcoming Examples, the combination of high porosity and air flow resistance enables the provided acoustic articles to act as both an acoustic absorber and acoustic barrier. In these embodiments, porous carbons such as activated carbons having extremely high surface area (typically over 800 $m^2/g$) are loaded at high levels to dissipate significant amount of acoustic energy. Surprisingly, these materials can provide a sound insulation performance exceeding what is predicted by mass law for a solid barrier having the same thickness.

METHODS OF USE

The provided acoustic articles can be incorporated in numerous and diverse applications for controlling sound transmission. For example, the primary structures of FIGS. 9-14 could be parts of a stationary structure, a land vehicle, an aquatic vehicle, or an aerospace vehicle. Examples of stationary structures include buildings and noise generating devices, such as machinery. Examples of land vehicles include automobiles and trains. Examples of aerospace vehicles include airplanes, helicopters, and spacecraft.

Land vehicles include commercial trucks, passenger trucks, automatous vehicles, trailers, rail vehicles, rail engines, motorcycles and the like. For such vehicles, the provided acoustic articles can be included in the doors, roofs, underneath floors, vehicle trucks, engines compartments, baggage areas and tires. Rail vehicles include subway cars, local commuter trains and high-speed trains.

Examples of building devices include HVAC (Heating, Ventilation, Air Conditioning) systems, which encompass heating and cooling devices, radiators, blowers and corresponding duct work and air handling equipment. Mechanical devices include internal combustion engines, motors, stamping presses, compressors, dryers, pumps, injection molders, ovens, mechanical transport devices, conveyors, and can further include industrial/commercial or home equipment such as lawn/grass mowers, blowers, snow blowers, tractors, plows, and harvesters. Other home and building devices include appliances such as refrigerators, microwaves, dishwashers, clothes washers, clothes dryers, vacuum cleaners, and ice makers.

More broadly, the provided acoustic articles can be used in buildings, homes, commercial locations, manufacturing plants, airports, power stations, power generating plants, hospitals, subways, tunnels, elevators, escalators, shopping centers, retail centers, sports stadiums, concert halls, warehouses, and office buildings. Specific applications include use in ceiling tiles, sound reducing panels, walls, cubical walls and floors. It is also possible to laminate or otherwise apply decorative wall coverings (e.g., wall paper, cloth, curtains) to the acoustic articles or assemblies. Likewise, the acoustic articles can be useful in electronics including computers, cell phones, tablets, and server farms. If desired, the provided articles and assemblies can include flame retardant additives.

When the acoustic article is disposed in a structure or vehicle, the article can be positioned and secured between two panels. In the case of an automobile or aircraft, a first panel can be an interior trim material and the second panel can be an exterior surface such as an automobile body or aircraft fuselage that can include a material such as steel or aluminum. In some additional examples, the acoustic article can be disposed with a shell or bag that at least partially surrounds acoustic article. The first and second panels are then attached to the shell. The shell can include any suitable material such as a polyvinyl fluoride, polyether ketone, polyether ether ketone, polyimide, a polyethylene, a polyvinylidene fluoride, an epoxy, or a mixture thereof. The shell can further include a reinforcing material chosen from a polyamide, a non-woven scrim, a mineral fiber, or a mixture thereof.

While not intended to be exhaustive, further embodiments of the acoustic articles, assemblies and related methods are as follows:

1. An acoustic article comprising: a porous layer; and heterogeneous filler in contact with the porous layer, the heterogeneous filler comprising porous carbon and having an average surface area of from 0.1 $m^2/g$ to 10,000 $m^2/g$, wherein the acoustic article has a flow resistance of from 100 MKS Rayls to 8000 MKS Rayls.
2. The acoustic article of embodiment 1, wherein the acoustic article has a flow resistance of from 100 MKS Rayls to 6000 MKS Rayls.
3. The acoustic article of embodiment 2, wherein the acoustic article has a flow resistance of from 100 MKS Rayls to 5000 MKS Rayls.
4. The acoustic article of any one of embodiments 1-3, wherein the porous layer comprises a non-woven fibrous layer having a plurality of fibers, the heterogeneous filler at least partially enmeshed in the plurality of fibers.
5. The acoustic article of embodiment 4, wherein the plurality of fibers has a median fiber diameter of from 0.1 micrometers to 2000 micrometers.
6. The acoustic article of embodiment 5, wherein the plurality of fibers has a median fiber diameter of from 5 micrometers to 1000 micrometers.
7. The acoustic article of embodiment 6, wherein the plurality of fibers has a median fiber diameter of from 10 micrometers to 500 micrometers.
8. The acoustic article of any one of embodiments 4-7, wherein the plurality of fibers comprise a polymer selected from polyolefin, polypropylene, polyethylene, polyester, polyethylene terephthalate, polybutylene terephthalate, polyamide, nylon 6,6, polyurethane, polybutene, polylactic acid, polyphenylene sulfide, polysulfone, liquid crystalline polymer, polyethylene-co-vinylacetate, polyacrylonitrile, cyclic polyolefin, or copolymer or blend thereof in an amount of at least 35% by weight, based on the overall weight of the plurality of fibers.
9. The acoustic article of any one of embodiments 4-8, wherein the plurality of fibers comprise an adhesive fiber.
10. The acoustic article of any one of embodiments 4-9, wherein the plurality of fibers comprise a thermoplastic semi-crystalline polymer.
11. The acoustic article of any one of embodiments 4-9, wherein the plurality of fibers comprise melt blown fibers.
12. The acoustic article of any one of embodiments 4-11, wherein the plurality of fibers comprise: a plurality of first fibers having a median diameter of up to 10 micrometers; and a plurality of second fibers having a median diameter of at least 10 micrometers.
13. The acoustic article of any one of embodiments 4-12, wherein the plurality of fibers comprise a polymer having a weight average molecular weight greater than 20,000 g/mol.
14. The acoustic article of any one of embodiments 4-13, wherein the fibrous non-woven layer displays a Shrinkage after 7 days at 150° C. of less than 15% based on the Shrinkage Test.
15. The acoustic article of any one of embodiments 4-9, wherein the plurality of fibers comprise fiberglass.
16. The acoustic article of any one of embodiments 1-3, wherein the porous layer comprises an open-celled foam.
17. The acoustic article of embodiment 1-3, wherein the porous layer comprises a particulate bed.
18. The acoustic article of embodiment 17, wherein the particulate bed comprises particles of activated carbon, vermiform carbon, zeolite, Metal Organic Framework (MOF), perlite, alumina, glass bubbles, glass beads, and mixtures thereof
19. The acoustic article of embodiment 17 or 18, wherein the particulate bed comprises particles having an average particle size of from 0.1 micrometers to 2000 micrometers.
20. The acoustic article of embodiment 19, wherein the particulate bed comprises particles having an average particle size of from 5 micrometers to 1000 micrometers.
21. The acoustic article of embodiment 20, wherein the particulate bed comprises particles having an average particle size of from 10 micrometers to 500 micrometers.
22. The acoustic article of any one of embodiments 1-3, wherein the porous layer comprises a perforated film having a plurality of apertures with an average narrowest diameter of from 30 micrometers to 5000 micrometers, the heterogeneous filler extending in a layer across the perforated film.
23. The acoustic article of embodiment 22, wherein the perforated film alone has a flow resistance of from 10 MKS Rayls to 8000 MKS Rayls.
24. The acoustic article of embodiment 23, wherein the perforated film alone has a flow resistance of from 30 MKS Rayls to 6000 MKS Rayls.
25. The acoustic article of any one of embodiments 22-24, wherein the perforated film is adhesively coupled to the layer of heterogeneous filler.
26. The acoustic article of embodiment 25, wherein the plurality of fibers comprise tacky fibers that adhesively couple the perforated film to the layer of heterogeneous filler.
27. The acoustic article of any one of embodiments 22-26, wherein at least some of heterogeneous filler reside within the plurality of apertures.
28. The acoustic article of any one of embodiments 1-27, wherein the porous layer has a flexural modulus of from 0.1 GPa to 420 GPa.
29. The acoustic article of embodiment 28, wherein the porous layer has a flexural modulus of from 0.2 GPa to 210 GPa.
30. The acoustic article of embodiment 29, wherein the porous layer has a flexural modulus of from 0.2 GPa to 5 GPa.
31. The acoustic article of any one of embodiments 1-30, wherein the porous layer has a thickness of from 1 micrometer to 10 centimeters.

32. The acoustic article of any embodiment 31, wherein the porous layer has a thickness of from 30 micrometers to 1 centimeter.
33. The acoustic article of embodiment 32, wherein the porous layer has a thickness of from 50 micrometers to 5000 micrometers.
34. The acoustic article of any one of embodiments 1-33, wherein the porous layer is a first porous layer and further comprising a second porous layer extending across the first porous layer and having a flow resistance of from 10 MKS Rayls to 8000 MKS Rayls.
35. The acoustic article of embodiment 34, wherein the second porous layer has a flow resistance of from 30 MKS Rayls to 6000 MKS Rayls.
36. The acoustic article of embodiment 35, wherein the second porous layer has a flow resistance of from 50 MKS Rayls to 4000 MKS Rayls.
37. The acoustic article of any one of embodiments 34-36, wherein the second porous layer comprises a nonwoven fibrous layer.
38. The acoustic article of any one of embodiments 34-36, wherein the second porous layer comprises a perforated film having a plurality of apertures with an average narrowest diameter of from 30 micrometers to 5000 micrometers.
39. The acoustic article of embodiment 34-38, wherein the second porous layer acts to secure the heterogeneous filler within the first porous layer.
40. The acoustic article of any one of embodiments 34-39, wherein the second porous layer has a thickness of from 0.01 millimeters to 100 millimeters.
41. The acoustic article of any embodiment 40, wherein the second porous layer has a thickness of from 0.1 millimeters to 50 millimeters.
42. The acoustic article of embodiment 41, wherein the second porous layer has a thickness of from 0.3 millimeters to 10 millimeters.
43. The acoustic article of any one of embodiments 1-42, wherein the heterogeneous filler is present in an amount of from 10% to 95% by weight relative to the overall weight of the porous layer and heterogeneous filler contacting the porous layer.
44. The acoustic article of embodiment 43, wherein the heterogeneous filler is present in an amount of from 15% to 85% by weight relative to the weight of the porous layer.
45. The acoustic article of embodiment 44, wherein the heterogeneous filler is present in an amount of from 20% to 80% by weight relative to the weight of the porous layer.
46. The acoustic article of embodiment 34-45, wherein the heterogeneous filler is further disposed in the second porous layer.
47. The acoustic article of embodiment 46, wherein the heterogeneous filler in the second porous layer is present in an amount of from 10% to 95% by weight relative to the overall weight of the second porous layer and heterogeneous filler contacting the second porous layer.
48. The acoustic article of embodiment 47, wherein the heterogeneous filler in the second porous layer is present in an amount of from 15% to 85% by weight relative to the weight of the second porous layer.
49. The acoustic article of embodiment 48, wherein the heterogeneous filler in the second porous layer is present in an amount of from 20% to 80% by weight relative to the weight of the second porous layer.
50. The acoustic article of any one of embodiments 1-49, further comprising a resistive layer extending across at least a portion of a major surface of the porous layer, the resistive layer having a flow resistance of from 10 MKS Rayls to 8000 MKS Rayls.
51. The acoustic article of embodiment 50, wherein the resistive layer has a flow resistance of from 20 MKS Rayls to 6000 MKS Rayls.
52. The acoustic article of embodiment 51, wherein the resistive layer has a flow resistance of from 30 MKS Rayls to 4000 MKS Rayls.
53. The acoustic article of any one of embodiments 50-52, wherein the resistive layer comprises a scrim.
54. The acoustic article of any one of embodiments 50-53, wherein the resistive layer has a thickness of from 1 micrometers to 10 centimeters.
55. The acoustic article of any embodiment 54, wherein the resistive layer has a thickness of from 30 micrometers to 1 centimeters.
56. The acoustic article of embodiment 55, wherein the resistive layer has a thickness of from 50 micrometers to 5000 micrometers.
57. The acoustic article of any one of embodiments 1-56, further comprising an air gap adjacent to the porous layer.
58. The acoustic article of embodiment 57, wherein the air gap has a thickness of from 10 micrometers to 10 centimeters.
59. The acoustic article of any embodiment 58, wherein the air gap has a thickness of from 500 micrometers to 5 centimeters.
60. The acoustic article of embodiment 59, wherein the air gap has a thickness of from 1 millimeter to 3 centimeters.
61. The acoustic article of any one of embodiments 1-60, wherein the heterogeneous filler has an average surface area of from 0.5 $m^2/g$ to 5000 $m^2/g$.
62. The acoustic article of embodiment 61, wherein the heterogeneous filler has an average surface area of from 50 $m^2/g$ to 2500 $m^2/g$.
63. The acoustic article of any one of embodiments 1-62, wherein the heterogeneous filler has a number average pore size of from 0.1 nanometers to 50 micrometers.
64. The acoustic article of embodiment 63, wherein the heterogeneous filler has a number average pore size of from 1 nanometer to 40 micrometers.
65. The acoustic article of embodiment 64, wherein the heterogeneous filler has a number average pore size of from 2.5 nanometers to 30 micrometers.
66. The acoustic article of any one of embodiments 1-65, wherein the heterogeneous filler has a minimum pore size of up to 500 nanometers.
67. The acoustic article of embodiment 66, wherein the heterogeneous filler has a minimum pore size of up to 200 nanometers.
68. The acoustic article of embodiment 67, wherein the heterogeneous filler has a minimum pore size of up to 100 nanometers.
69. The acoustic article of any one of embodiments 1-68, wherein the heterogeneous filler further comprises porous alumina, zeolite, mica, aerogel, silica, vermiculite, perlite, metal organic framework, or a mixture thereof.
70. The acoustic article of embodiment 69, wherein the heterogeneous filler has a number average pore volume of from 0.01 $cm^3/g$ to 5 $cm^3/g$.

71. The acoustic article of embodiment 70, wherein the porous carbon comprises activated carbon.
72. The acoustic article of embodiment 70 or 71, wherein the porous carbon comprises vermiform carbon.
73. The acoustic article of any one of embodiments 1-72, wherein the heterogeneous filler comprises closed pore filler.
74. The acoustic article of embodiment 73, wherein the closed pore filler comprises expanded polymeric microspheres, ceramic microspheres, hollow glass bubbles, or a mixture thereof
75. The acoustic article of any one of embodiments 1-74, wherein the heterogeneous filler comprises particles that are substantially decoupled from each other.
76. The acoustic article of any one of embodiments 1-75, wherein the heterogeneous filler has a number average particle size of from 0.1 micrometers to 2000 micrometers.
77. The acoustic article of embodiment 76, wherein the heterogeneous filler has a number average particle size of from 10 micrometers to 1000 micrometers.
78. The acoustic article of embodiment 77, wherein the heterogeneous filler has a number average particle size of from 30 micrometers to 500 micrometers.
79. The acoustic article of any one of embodiments 1-78, wherein the heterogeneous filler is a blended filler comprising: a first heterogeneous filler having an average surface area of up to 1300 m²/g; and a second heterogeneous filler having an average surface area of at least 1300 m²/g.
80. The acoustic article of any one of embodiments 1-78, wherein the heterogeneous filler comprises: a first heterogeneous filler having a number average pore size of from up to 500 nanometers; and a second heterogeneous filler having a number average pore size of at least 500 nanometers.
81. The acoustic article of any one of embodiments 1-78, wherein the heterogeneous filler comprises: a first heterogeneous filler comprising porous carbon; and a second heterogeneous filler comprising one or more of zeolite, alumina, glass bubbles, carbon black, carbon fiber, and glass beads.
82. An acoustic article comprising: a perforated film having a plurality of apertures with an average narrowest diameter of from 30 micrometers to 5000 micrometers; and heterogeneous filler extending in a layer across the perforated film, wherein at least some of heterogeneous filler resides within the plurality of apertures.
83. A method of making an acoustic article comprising: disposing a heterogeneous filler comprising porous carbon into a porous layer, the heterogeneous filler having an average surface area of from 0.1 m²/g to 10,000 m²/g to increase acoustical absorption of the acoustic article at sound frequencies of from 50 Hz to 2,000 Hz.
84. The method of embodiment 83, wherein the porous layer comprises a non-woven fibrous web comprising a plurality of fibers, the porous carbon being at least partially enmeshed in the plurality of fibers.
85. The method of embodiment 83, wherein the porous layer comprises a perforated film having a plurality of apertures with an average narrowest diameter of from 30 micrometers to 5000 micrometers, wherein disposing the heterogeneous filler into the porous layer comprises disposing the heterogeneous filler into the plurality of apertures.
86. The method of any one of embodiments 83-85, wherein the porous layer is a first porous layer and further comprising disposing a second porous layer on the first porous layer to secure the heterogeneous filler within the first porous layer.
87. The method of embodiment 86, wherein the second porous layer comprises a perforated film having a plurality of apertures with an average narrowest diameter of from 30 micrometers to 5000 micrometers.
88. The method of any one of embodiments 83-87, wherein the porous layer has a flow resistance of from 10 MKS Rayls to 8000 MKS Rayls.
89. An acoustic assembly comprising the acoustic article of any one of embodiments 1-82, and further comprising a primary aerospace or automotive structure coupled to the acoustic article.
90. A method of using the acoustic article of any one of embodiments 1-82, comprising: disposing the acoustic article proximate to a surface to dampen vibrations of the surface.
91. A method of using the acoustic article of any one of embodiments 1-82, comprising: disposing the acoustic article proximate to an air cavity to absorb sound energy being transmitted through the air cavity.
92. The method of using the acoustic article of embodiment 91, wherein absorption of sound energy occurs with essentially zero net flow of fluid through the acoustic article.

EXAMPLES

TABLE 1

Materials

| Designation | Description | Source |
|---|---|---|
| PP-1 | Film-grade polypropylene resin, available under the designation "C700-35N", with black masterbatch added at 3 wt. %. | Braskem, São Paulo, Brazil |
| AC-1 | Activated carbon particles, mesh size 60 x 150 (range of largest diameter "d": 80 < d < 250 micrometers), grade GWH. Surface area was measured and found to be 1626 m²/g. | Kuraray Chemical Co., LTD, Osaka, Japan |
| AC-2 | Activated carbon particles, mesh size 32 x 60 (range of largest diameter "d": 250 < d < 600 micrometers), grade GWH. Surface area was measured and found to be 1561 m²/g. | Kuraray Chemical Co., LTD, Osaka, Japan |
| AC-3 | Activated carbon particles, mesh size 48 x 100 (range of largest diameter "d": 140 < d < 300 micrometers), grade GWH. Surface area was measured and found to be 1611 m²/g. | Kuraray Chemical Co., LTD, Osaka, Japan |
| BMF-1 | A nonwoven polypropylene/polyethylene insulation material, area density of about 300 grams per square meter ("gsm"), thickness = 40 mm, available under the trade designation "3M THINSULATE ACOUSTIC INSULATION TC3403" and includes SMS (spun-bond/melt-blown/spun-bond) scrims top and bottom, having and area density for the scrims of about 20 gsm | 3M Co., St. Paul, MN, United States |
| BMF-2 | A nonwoven polypropylene/polyethylene insulation material, total density = 8.9 kg/m³, area density of about 178 gsm, thickness = 20 mm, available under the trade designation "3M THINSULATE ACOUSTIC INSULATION TC2303" and includes SMS (spun-bond/melt- | 3M Co., St. Paul, MN, United States |

TABLE 1-continued

| Designation | Description | Source |
|---|---|---|
| | blown/spun-bond) scrims top and bottom, having and area density for the scrims of about 20 gsm | |
| Layered SMS Scrims | Polypropylene and polyethylene fabric having an area density of about 20 gsm available under the designation Spunbond Bico. Three of the fabrics were laid atop one another resulting in an area density of about 60 gsm. Air flow resistance of about 650 Rayls. | Fitesa, Simpsonville, SC, United States |

Test Methods

Normal Incident Acoustical Absorption

Normal incident acoustical absorption was tested according to ASTM E1050-12, "Standard Test Method for Impedance and Absorption of Acoustical Materials Using a Tube, Two Microphones and a Digital Frequency Analysis System". An "IMPEDANCE TUBE KIT (50 HZ-6.4 KHZ) TYPE 4206" available from Brüel & Kjaer (Denmark) was used. The normal incident absorption coefficient was reported, using the abbreviation "a".

Transmission Loss Acoustic Testing

The transmission loss of an acoustic material to check barrier properties was measured by following the procedures outlined in ASTM E2611-09 (Standard Test Method for Measurement of Normal Incidence Sound Transmission of Acoustical Materials Based on the Transfer Matrix Method). The transmission coefficient, the reflection coefficient, and the dissipation coefficient representing the acoustic energy being transmitted, reflected and dissipated by the material were calculated and reported as T, R, and $\alpha_d$.

Surface Area of the Activated Carbon Materials

Surface area of the commercially obtained activated carbon materials was analyzed using an AUTOSORB IQ (Quantachrome Instruments, Boynton Beach, Florida). Surface area was determined by $N_2$ adsorption at 77 K.

Air Flow Resistance

Flow resistance across the "manually peeled Densified Layer portion" was measured according to ASTM C-522-03 (Reapproved 2009), "Standard Test Method for Airflow Resistance of Acoustical Materials". The equipment used for the measurement was a PERMEAMETER, Model Number GP-522-A, available from Porous Materials, Inc., Ithaca, NY. The flow resistance was reported in Rayls (Pa·s/m).

Flow resistance for the BMF-web particle layers in the examples was measured to be about 30 MKS Rayls.

Example 1 (EX-1)

A nonwoven melt blown web was prepared by a process similar to that described in Wente, Van A., "Superfine Thermoplastic Fibers" in Industrial Engineering Chemistry, Vol. 48, pages 1342 et seq. (1956), and in Report No. 4364 of the Naval Research Laboratories, published May 25, 1954 entitled "Manufacture of Superfine Organic Fibers" by Wente, Van. A. Boone, C. D., and Fluharty, E. L., except that a drilled die was used to produce the fibers.

A polypropylene resin was extruded through the die into a high velocity stream of heated air which drew out and attenuated the polypropylene blown microfibers ("BMF") prior to their solidification and collection. The stream of polypropylene blown microfibers was blended with polypropylene staple fibers according to the method described in U.S. Pat. No. 4,118,531 (Hauser). Additionally, AC-1 activated carbon particles were fed into the stream of polypropylene blown microfibers, according to the method of U.S. Pat. No. 3,971,373 (Braun). The blend of polypropylene blown microfibers, polypropylene staple fibers, and activated carbon particles was collected in a random fashion on a nylon belt, affording the polypropylene BMF-web particle layer loaded with activated carbon particles. The BMF-web particle layer was loaded with a ratio of 95 wt. % activated carbon particles and 5 wt. % blown microfibers, for a total area density of 200 gsm.

Normal incident acoustical absorption was tested according to ASTM E1050-12. The particle layer of EX-1 was mounted in an impedance tube with a 20-mm air space backing. Test results were as summarized in Table 2.

TABLE 2

Normal incident acoustic absorption ("α") for EX-1

| Frequency, Hz | α |
|---|---|
| 99 | 0.03 |
| 125 | 0.05 |
| 157 | 0.03 |
| 198 | 0.05 |
| 250 | 0.06 |
| 315 | 0.07 |
| 397 | 0.08 |
| 500 | 0.10 |
| 630 | 0.14 |
| 794 | 0.19 |
| 1000 | 0.27 |
| 1260 | 0.37 |
| 1587 | 0.52 |
| 2000 | 0.67 |
| 2520 | 0.78 |
| 3175 | 0.82 |

Example 2 (EX-2)

Activated carbon AC-1 (3 g) was randomly distributed through a sample of BMF-1 (using manual tearing to distribute particles through the web) for a total area density of 680 gsm. The thickness of the sample of the resulting BMF web was 40 mm. The normal incident acoustical absorption was tested according to ASTM E1050-12. Test results were as summarized in Table 3.

Test results for BMF-1 (as received, without activated carbon particles) were also as summarized in Table 3.

Example 3 (EX-3)

Activated carbon AC-1 (6 g) was randomly applied through a sample of BMF-1 (using manual tearing to distribute particles through the web) for a total area density of 1450 gsm. The thickness of the sample of the resulting BMF web was 40 mm. The normal incident acoustical absorption was tested according to ASTM E1050-12. Test results were as summarized in Table 3.

Example 4 (EX-4)

Activated carbon AC-1 (20 g) was randomly applied through a sample of BMF-1 (using manual tearing to distribute particles through the web) for a total area density of 2900 gsm. The thickness of the sample of the resulting BMF web was 40 mm. The normal incident acoustical absorption was tested according to ASTM E1050-12. Test results were as summarized in Table 3.

TABLE 3

| Frequency, | α | | | |
|---|---|---|---|---|
| Hz | EX-2 | EX-3 | EX-4 | BMF-1 |
| 63 | 0.03 | 0.04 | 0.06 | 0.02 |
| 79 | 0.04 | 0.05 | 0.08 | 0.03 |
| 99 | 0.06 | 0.08 | 0.10 | 0.04 |
| 125 | 0.07 | 0.09 | 0.13 | 0.05 |
| 157 | 0.07 | 0.10 | 0.15 | 0.05 |
| 198 | 0.11 | 0.15 | 0.20 | 0.07 |
| 250 | 0.15 | 0.20 | 0.26 | 0.09 |
| 315 | 0.20 | 0.26 | 0.32 | 0.11 |
| 397 | 0.27 | 0.35 | 0.41 | 0.15 |
| 500 | 0.37 | 0.46 | 0.51 | 0.20 |
| 630 | 0.49 | 0.59 | 0.63 | 0.28 |
| 794 | 0.62 | 0.72 | 0.76 | 0.39 |
| 1000 | 0.76 | 0.85 | 0.87 | 0.53 |
| 1260 | 0.88 | 0.95 | 0.95 | 0.68 |
| 1587 | 0.94 | 0.99 | 0.99 | 0.80 |

Example 5 (EX-5)

A three-layer acoustic article (see 100 in FIG. 1) was constructed by placing a BMF-web particle layer according to EX-1 (see FIG. 1; layer 104 had thickness=3 mm) between two layers of BMF-1 (layer 102 with thickness=11.3 mm, and layer 106 with thickness=25.7 mm), such that the BMF-web particle layer was more disposed to one major surface of the acoustic article. The total construction was set to have a thickness of 40 mm when mounted in an impedance tube for normal incident absorption coefficient.

The normal incident acoustical absorption for EX-5 was tested according to ASTM E1050-12, with test results as summarized in Table 4. In one testing configuration, the particle layer was disposed in "front" (i.e., towards the sound source—see 204 in acoustic article 200 in FIG. 1); in a second testing configuration, the particle layer was disposed in "back" (i.e., farther from the sound source—see layer 104 in acoustic article 100 in FIG. 2).

TABLE 4

| | α | | | |
|---|---|---|---|---|
| Frequency, Hz | EX-5, AC layer in "front" | EX-5, AC layer in "back" | EX-6 | BMF-1 (comparative) |
| 63 | 0.03 | 0.03 | 0.04 | 0.02 |
| 79 | 0.05 | 0.05 | 0.05 | 0.03 |
| 99 | 0.06 | 0.06 | 0.07 | 0.04 |
| 125 | 0.08 | 0.07 | 0.09 | 0.05 |
| 157 | 0.09 | 0.08 | 0.10 | 0.05 |
| 198 | 0.13 | 0.12 | 0.15 | 0.07 |
| 250 | 0.18 | 0.16 | 0.22 | 0.09 |
| 315 | 0.25 | 0.22 | 0.30 | 0.11 |
| 397 | 0.35 | 0.31 | 0.41 | 0.15 |
| 500 | 0.47 | 0.41 | 0.54 | 0.20 |
| 630 | 0.60 | 0.54 | 0.68 | 0.28 |
| 794 | 0.75 | 0.68 | 0.81 | 0.39 |
| 1000 | 0.87 | 0.81 | 0.91 | 0.53 |
| 1260 | 0.96 | 0.91 | 0.98 | 0.68 |
| 1587 | 0.99 | 0.96 | 1.00 | 0.80 |

Example 6 (EX-6)

A five-layered acoustic article (see 300 in FIG. 2) was constructed by interspersing two particle layers according to EX-1 (layers 304 and 308, each having thickness=3 mm) among three layers of BMF-1 (layers 302, 306, and 310, each having thickness=11.3 mm). The total construction was set to have a thickness of 40 mm when mounted in an impedance tube for normal incident absorption coefficient.

The normal incident acoustical absorption for EX-6 was tested according to ASTM E1050-12, with test results as summarized in Table 4, reporting normal incident absorption coefficient "α".

Example 7 (EX-7)

Figure 15C:
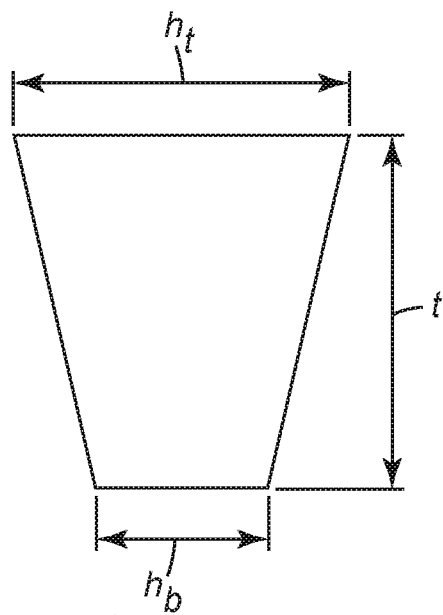

A microperforated film "sandwich" (see 500 in FIG. 6) was constructed from two layers of microperforated film and AC-1 particles. A microperforated film was prepared as described in U.S. Pat. No. 6,617,002 (Wood). A film-grade polypropylene resin PP-1 was used in extrusion of a polypropylene film (1.8 mm thickness), and then the film was embossed and heat treated so that the embossing created apertures. The dimensions of the apertures were as detailed in FIGS. 15a-15c and in Table 5.

TABLE 5

| Dimension for apertures in microperforated film of EX-7 | | | | | |
|---|---|---|---|---|---|
| | $H_t$ | $h_b$ | $w_t$ | $w_b$ | t | b (hole separation) |
| Averaged value in micrometers | 1722 | 533 | 265 | 245 | 1800 | 1312 |

TABLE 6

| | α | |
|---|---|---|
| Frequency, Hz | EX-5 tested with 20 mm air gap | EX-5 tested with 30 mm air gap |
| 250 | 0.10 | 0.18 |
| 315 | 0.14 | 0.26 |
| 397 | 0.20 | 0.36 |
| 500 | 0.28 | 0.49 |
| 630 | 0.41 | 0.63 |
| 794 | 0.56 | 0.76 |
| 1000 | 0.73 | 0.85 |
| 1260 | 0.86 | 0.88 |
| 1587 | 0.91 | 0.86 |
| 2000 | 0.88 | 0.80 |
| 2520 | 0.83 | 0.76 |
| 3175 | 0.75 | 0.68 |
| 4000 | 0.68 | 0.64 |
| 5040 | 0.63 | 0.60 |
| 6350 | 0.59 | 0.69 |

One layer of the microperforated film (see 504 in FIG. 5) was oriented with the generally conical apertures opening with the larger diameter facing upward, and were sprinkled with AC-1 particles to at least partially fill the apertures (see 505 in FIG. 5). A second layer of the same type of microperforated film was placed onto the first layer, oriented with the generally conical apertures opening with the larger diameter facing downward, such that it covered the at least partially filled apertures (see 500 in FIG. 6; in this example, layers 502 and 504 have the same thickness and aperture dimensions, and distances between apertures). No attempt was made to perfectly align the apertures of the two microperforated film layers. The resulting acoustic article of EX-7 had a total area density of about 25 gsm.

The normal incident acoustical absorption for the acoustic article of EX-7 was tested according to ASTM E1050-12.

The test configuration included an "air gap" (see 640 in FIG. 6) set to either 20 mm or 30 mm. Test results were as summarized in Table 6.

TABLE 6

| Frequency, Hz | α | |
|---|---|---|
| | EX-5 tested with 20 mm air gap | EX-5 tested with 30 mm air gap |
| 250 | 0.10 | 0.18 |
| 315 | 0.14 | 0.26 |
| 397 | 0.20 | 0.36 |
| 500 | 0.28 | 0.49 |
| 630 | 0.41 | 0.63 |
| 794 | 0.56 | 0.76 |
| 1000 | 0.73 | 0.85 |
| 1260 | 0.86 | 0.88 |
| 1587 | 0.91 | 0.86 |
| 2000 | 0.88 | 0.80 |
| 2520 | 0.83 | 0.76 |
| 3175 | 0.75 | 0.68 |
| 4000 | 0.68 | 0.64 |
| 5040 | 0.63 | 0.60 |
| 6350 | 0.59 | 0.69 |

Example 8 (EX-8)

A BMF-web particle layer was prepared according to the procedure described for EX-1, except that a polyurethane ("PU") resin was used in place of the polypropylene resin, and AC-2 activated carbon particles were used in place of the AC-1 activated carbon particles. The resulting PU BMF-web particle layer had a ratio of 95 wt. % activated carbon particles and 5 wt. % blown microfibers.

The PU BMF-web particle layer was placed into a sample of BMF-2 to make a "sandwich" construction (see acoustic article 700 in FIG. 8). One of the resistive scrim layers (see 706 in FIG. 8) of the BMF-2 nonwoven layer (see 704 in FIG. 8) was peeled back, and the PU BMF-web particle layer (see 702 in FIG. 8) was placed along the interior surface of the scrim layer, and the scrim layer was reclosed to give the sandwich construction having an area density of 8.9 gsm Normal incident acoustical absorption was tested according to ASTM E1050-12. The particle layer of EX-8 was mounted in an impedance tube with a 20-mm air space backing. Thickness of the acoustic article of EX-8 as tested was 10 mm. For comparison, a layer of BMF-2 was also tested at a thickness of 10 mm. Test results were as summarized in Table 7.

TABLE 7

| Frequency, Hz | α | | |
|---|---|---|---|
| | BMF-2 (comparative) | EX-8 tested with particle layer facing towards sound source | EX-8 tested with particle layer facing away from sound source |
| 63 | 0.02 | 0.03 | 0.03 |
| 79 | 0.02 | 0.04 | 0.03 |
| 99 | 0.03 | 0.04 | 0.03 |
| 125 | 0.03 | 0.05 | 0.04 |
| 157 | 0.04 | 0.05 | 0.05 |
| 198 | 0.04 | 0.07 | 0.06 |
| 250 | 0.05 | 0.07 | 0.07 |
| 315 | 0.06 | 0.10 | 0.08 |
| 397 | 0.07 | 0.12 | 0.11 |
| 500 | 0.09 | 0.15 | 0.13 |
| 630 | 0.11 | 0.18 | 0.17 |
| 794 | 0.14 | 0.23 | 0.21 |
| 1000 | 0.19 | 0.30 | 0.27 |
| 1260 | 0.26 | 0.39 | 0.35 |
| 1587 | 0.33 | 0.48 | 0.43 |

Preparation of BMF-3

BMF-3 was made according to a process similar to that described in EX-1, except that no activated carbon particles were added. The polymeric material was polypropylene. BMF-3 included includes SMS (spun-bond/melt-blown/spun-bond) scrim layers top and bottom, having an area density of about 20 gsm. (similar to those found on commercially available BMF-1 and BMF-2). BMF-3 had a total area density of about 400 gsm and a thickness of about 20 mm.

Example 9 (EX-9)

An acoustic article having a sandwich construction (see 700 in FIG. 8) was prepared according to the procedure described in EX-8, except BMF-3 was used instead of BMF-2 as a nonwoven layer (see 704 in FIG. 8)

Normal incident acoustical absorption was tested according to ASTM E1050-12. The particle layer of EX-9 was mounted in an impedance tube with a 20-mm air space backing. Thickness of the acoustic article of EX-9 as tested was 10 mm. For comparison, a layer of BMF-3 was also tested at a thickness of 10 mm. Test results were as summarized in Table 8.

TABLE 8

| Frequency, Hz | α | | |
|---|---|---|---|
| | BMF-2 (comparative) | EX-9 tested with particle layer facing towards sound source | EX-9 tested with particle layer facing away from sound source |
| 63 | 0.03 | 0.03 | 0.03 |
| 79 | 0.03 | 0.03 | 0.04 |
| 99 | 0.03 | 0.03 | 0.04 |
| 125 | 0.03 | 0.04 | 0.05 |
| 157 | 0.03 | 0.04 | 0.05 |
| 198 | 0.03 | 0.06 | 0.07 |
| 250 | 0.05 | 0.07 | 0.08 |
| 315 | 0.06 | 0.08 | 0.10 |
| 397 | 0.07 | 0.10 | 0.12 |
| 500 | 0.08 | 0.12 | 0.14 |
| 630 | 0.10 | 0.16 | 0.19 |
| 794 | 0.15 | 0.22 | 0.26 |
| 1000 | 0.24 | 0.35 | 0.41 |
| 1260 | 0.38 | 0.55 | 0.61 |
| 1587 | 0.52 | 0.73 | 0.76 |

Example 10 (EX-10)

A BMF-web particle layer loaded with activated carbon particles was made according to the procedure described for EX-1, except that polyurethane material was used instead of polypropylene. The activated carbon particles had a mesh size of 32×60. The BMF-web particle layer was loaded with a ratio of 95 wt. % activated carbon particles and 5 wt. % blown microfibers, for a total area density of 1500 gsm. Thickness of the BMF-web particle layer was 5 mm.

Figure 16:
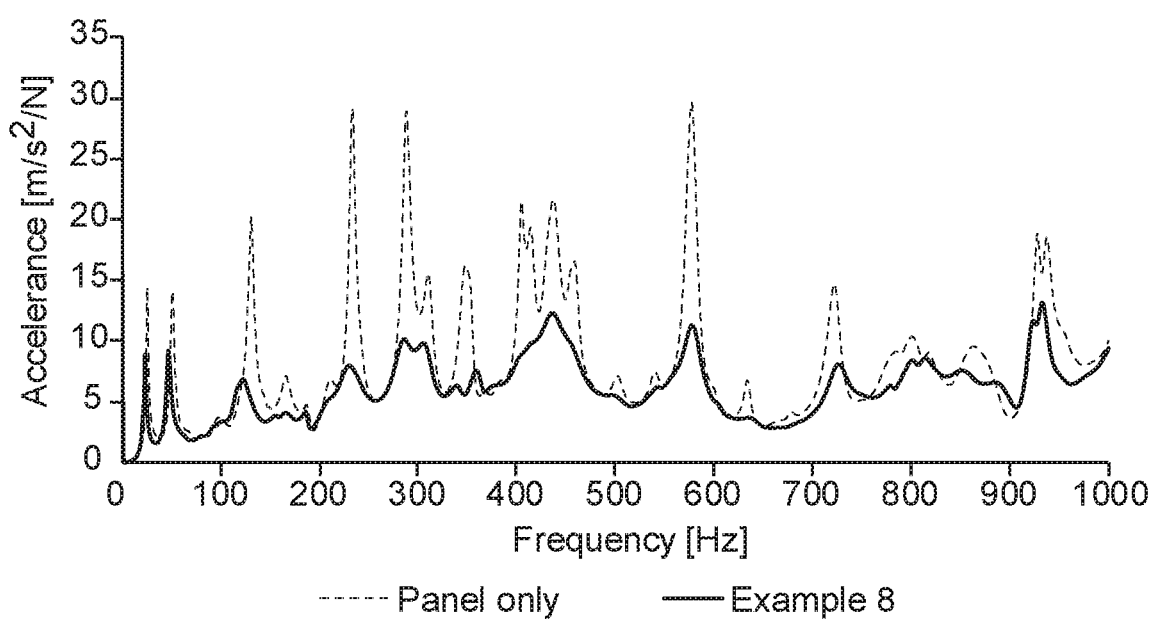
FIG. 16 is an accelerance plot comparing the acoustic response of an exemplary acoustic article and a comparative acoustic article.

Acoustic damping measurement of the BMF-web particle layer was carried out as follows. A sample of the BMF-web particle layer (354 mm by 288 mm) was placed on top of a steel panel (height=354 mm, width=288 mm, thickness=1 mm). The steel plate was shaken by a modal shaker positioned on the bottom side of the steel plate. The modal shaker provided a random noise signal, and the plate's vibration response was measured using accelerometers positioned on the same side of the steel plate as the modal shaker, but somewhat removed from the position where the shaker was against the steel plate. Accelerance response vs. frequency was measured, for both the steel panel only (comparative) and the steel panel having the BMF-web particle layer placed on top. The test results were as summarized in FIG. 16.

Example 11 (EX-11)

A BMF-web particle layer loaded with activated carbon AC-3 particles was made according to the procedure described for EX-1. The activated carbon particles had a mesh size of 48×100. The BMF-web particle layer was loaded with a ratio of 40 wt. % activated carbon particles and 60 wt. % blown microfibers, for a total area density of 400 gsm. Thickness of the BMF-web particle layer was 8 mm.

Transmission loss acoustic testing was performed accordingly to ASTM E2611-09. The results for normal incidence transmission loss were as represented in Table 9 and are compared against BMF-1 and mass law results at 300 gsm and 400 gsm.

TABLE 9

| | | α | | |
|---|---|---|---|---|
| Frequency, Hz | EX-11 | BMF-1 (comparative) | 300 gsm Mass Law (comparative) | 400 gsm Mass Law (comparative) |
| 100 | 2.80 | 1.81 | 0.22 | 0.38 |
| 125 | 4.23 | 1.69 | 0.33 | 0.57 |
| 160 | 4.09 | 1.81 | 0.54 | 0.92 |
| 200 | 4.95 | 2.00 | 0.81 | 1.36 |
| 250 | 5.53 | 2.31 | 1.23 | 1.99 |
| 315 | 6.32 | 2.47 | 1.80 | 2.82 |
| 400 | 7.02 | 2.73 | 2.61 | 3.92 |
| 500 | 7.71 | 3.04 | 3.60 | 5.17 |
| 630 | 8.66 | 3.34 | 4.86 | 6.69 |
| 800 | 9.60 | 3.73 | 6.34 | 8.37 |
| 1000 | 10.27 | 4.23 | 7.89 | 10.07 |
| 1250 | 10.88 | 4.81 | 9.58 | 11.87 |
| 1600 | 11.54 | 5.59 | 11.52 | 13.89 |
| 2000 | 12.11 | 6.37 | 13.35 | 15.76 |
| 2500 | 12.72 | 7.03 | 15.22 | 17.66 |
| 3150 | 12.73 | 7.53 | 17.04 | 19.50 |

The results for power transmission coefficient, the reflection coefficient, and dissipation coefficient specifically are represented in Table 10.

TABLE 10

| Frequency Hz | EX-11 T | EX-11 R | EX-11 $\alpha_d$ |
|---|---|---|---|
| 100 | 0.53 | 0.13 | 0.34 |
| 125 | 0.38 | 0.15 | 0.47 |
| 160 | 0.39 | 0.20 | 0.41 |

TABLE 10-continued

| Frequency Hz | EX-11 T | EX-11 R | EX-11 $\alpha_d$ |
|---|---|---|---|
| 200 | 0.32 | 0.21 | 0.47 |
| 250 | 0.28 | 0.27 | 0.45 |
| 315 | 0.23 | 0.32 | 0.44 |
| 400 | 0.20 | 0.35 | 0.45 |
| 500 | 0.17 | 0.38 | 0.45 |
| 630 | 0.14 | 0.42 | 0.44 |
| 800 | 0.11 | 0.45 | 0.44 |
| 1000 | 0.09 | 0.46 | 0.45 |
| 1250 | 0.08 | 0.47 | 0.45 |
| 1600 | 0.07 | 0.47 | 0.46 |
| 2000 | 0.06 | 0.45 | 0.49 |
| 2500 | 0.05 | 0.43 | 0.52 |
| 3150 | 0.05 | 0.56 | 0.39 |

Example 12 (EX-12)

A BMF-web particle layer loaded with activated carbon AC-3 particles was made according to the procedure described for EX-1. The activated carbon particles had a mesh size of 48×100. The BMF-web particle layer was loaded with a ratio of 80 wt. % activated carbon particles and 20 wt. % blown microfibers, for a total area density of 400 gsm. Thickness of the BMF-web particle layer was 1 mm. Air flow resistance (AFR) was tested and the result was about 350 Rayls.

Example 13 (EX-13)

A BMF-web particle layer loaded with activated carbon AC-3 particles was made according to the procedure described for EX-1. The activated carbon particles had a mesh size of 48×100. The BMF-web particle layer was loaded with a ratio of 40 wt. % activated carbon particles and 60 wt. % blown microfibers, for a total area density of 60 gsm. Thickness of the BMF-web particle layer was 1 mm. Air flow resistance (AFR) was tested and the result was about 650 Rayls.

Figure 17:
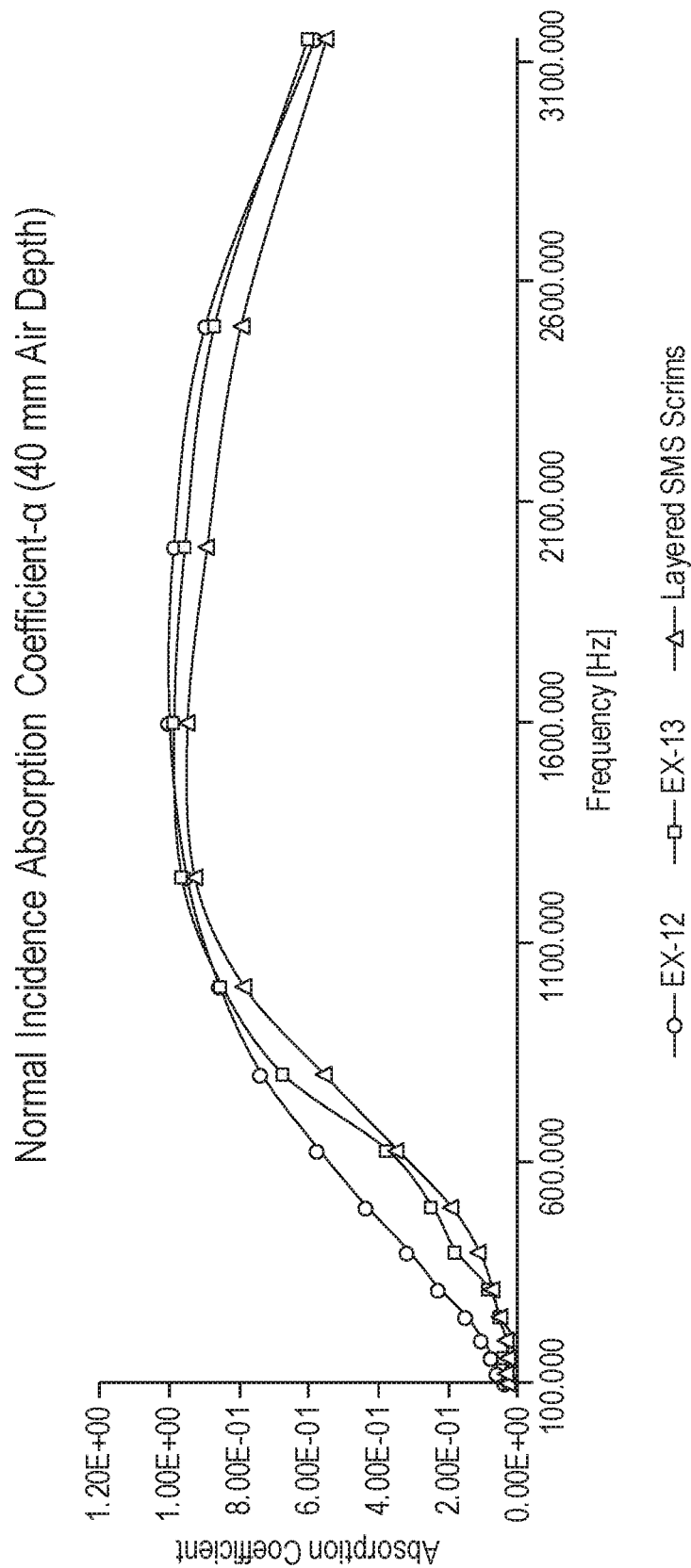
FIG. 17 is a normal incidence absorption coefficient plot comparing coefficients of exemplary acoustic articles and a comparative acoustic article.

Normal incidence acoustical absorption testing was performed to calculate the coefficient, α, as defined in ASTM E1050-12. FIG. 17 represents the normal incidence absorption coefficient for EX-12, EX-13, and Layered SMS Scrims based on frequency.

Specific acoustic impedance was calculated by performing normal incidence acoustical absorption testing to calculate the normal reflect absorption coefficient, R, as defined in ASTM E1050-12. Equation (1) was then used to calculate the specific acoustic impedance ratio.

$$\frac{Z}{\rho c} = \frac{1+R}{1-R} \quad (1)$$

FIG. 18 represents specific acoustic resistance ratio, reflecting the real part of the specific acoustic impedance ratio, for EX-12, EX-13, and Layered SMS Scrims, based on frequency. FIG. 19 represents the specific acoustic reactance ratio, reflecting the imaginary part of the specific acoustic impedance for EX-12, EX-13, and Layered SMS Scrims, based on frequency.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An acoustic article comprising:
a porous layer comprising a non-woven layer having a plurality of melt blown fibers with a median fiber diameter of from 10 micrometers to 60 micrometers; and
heterogeneous filler in contact with the porous layer, the heterogeneous filler comprising porous carbon and having an average surface area of from 0.1 $m^2/g$ to 10,000 $m^2/g$, the porous carbon comprising activated carbon, vermiform carbon, or a mixture thereof; and
a pair of resistive scrims, each having a thickness of less than 5 millimeters and a flow resistance of from 10 MKS Rayls to 2000 MKS Rayls, wherein the porous layer is disposed between the pair of resistive scrims, wherein the acoustic article has a flow resistance of from 100 MKS Rayls to 8000 MKS Rayls, and further wherein the heterogeneous filler is dispersed and physically and/or adhesively held in fibers of the non-woven layer and present in an amount of from 10% to 45% by weight relative to the overall weight of the porous layer and heterogeneous filler.

2. The acoustic article of claim 1, wherein the plurality of fibers comprise: a plurality of first fibers that are melt-blown fibers having a median diameter of up to 10 micrometers; and a plurality of second fibers that are staple fibers interspersed with the first fibers and having a median diameter of at least 10 micrometers.

3. The acoustic article of claim 1, wherein the plurality of fibers comprise a thermoplastic semi-crystalline polymer.

4. The acoustic article of claim 1, wherein the fibers of the porous layer are oriented on a molecular level.

5. The acoustic article of claim 1, wherein the plurality of fibers comprise a polymer having a weight average molecular weight greater than 20,000 g/mol.

6. The acoustic article of claim 1, wherein the porous layer is a first porous layer and further comprising a second porous layer extending across the first porous layer and having a flow resistance of from 10 MKS Rayls to 6000 MKS Rayls.

7. The acoustic article of claim 1, wherein the heterogeneous filler is present in an amount of from 15% to 40% by weight relative to the overall weight of the porous layer and heterogeneous filler contacting the porous layer.

8. The acoustic article of claim 1, wherein the heterogeneous filler comprises particles that are substantially decoupled from each other and the porous layer, whereby the particles of the heterogeneous filler can vibrate within the fibers of the porous layer independently of the fibers themselves.

9. The acoustic article of claim 1, wherein the resistive layer has a thickness of from 10 micrometers to 2000 micrometers.

10. The acoustic article of claim 9, wherein the resistive layer has a thickness of from 20 micrometers to 1000 micrometers.

11. The acoustic article of claim 10, wherein the resistive layer has a thickness of from 50 micrometers to 500 micrometers.

12. The acoustic article of claim 1, wherein the heterogeneous filler is a blended filler comprising:
a first heterogeneous filler having an average surface area of up to 1300 $m^2/g$; and
a second heterogeneous filler having an average surface area of at least 1300 $m^2/g$.

13. A method of making an acoustic article comprising:
disposing a heterogeneous filler comprising porous carbon into a porous layer comprising a non-woven layer having a plurality of melt blown fibers with a median fiber diameter of from 10 micrometers to 60 micrometers, the porous carbon comprising activated carbon, vermiform carbon, or a mixture thereof and the heterogeneous filler having an average surface area of from 0.1 $m^2/g$ to 10,000 $m^2/g$ to increase acoustical absorption of the acoustic article at sound frequencies of from 50 Hz to 2,000 Hz, wherein the heterogeneous filler is dispersed and physically and/or adhesively held in fibers of the non-woven layer in an amount of from 10% to 45% by weight relative to the overall weight of the porous layer and heterogeneous filler; and sandwiching the porous layer between a pair of resistive scrims, each having a flow resistance of from 10 MKS Rayls to 2000 MKS Rayls and a thickness of less than 5 millimeters.

14. An acoustic assembly comprising the acoustic article of claim 1, and further comprising a primary aerospace or automotive structure coupled to the acoustic article.

15. A method of using the acoustic article of claim 1, comprising:
disposing the acoustic article proximate to a surface to dampen vibrations of the surface.

16. A method of using the acoustic article of claim 1, comprising:
disposing the acoustic article proximate to an air cavity to absorb sound energy being transmitted through the air cavity.

* * * * *